United States Patent
Kanazawa et al.

(10) Patent No.: US 6,467,266 B1
(45) Date of Patent: Oct. 22, 2002

(54) BRAKE BOOSTER

(75) Inventors: Osamu Kanazawa, Higashimatsuyama (JP); Yoshiyasu Takasaki, Higashimatsuyama (JP); Michio Kobayashi, Higashimatsuyama (JP); Hiroshi Osaki, Higashimatsuyama (JP); Hidefumi Inoue, Higashimatsuyama (JP); Hiroyuki Oka, Higashimatsuyama (JP); Hiroaki Niino, Kariya (JP); Kazuya Maki, Kariya (JP); Mamoru Sawada, Kariya (JP)

(73) Assignees: Bosch Braking Systems Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/662,026

(22) Filed: Sep. 14, 2000

(30) Foreign Application Priority Data

Oct. 8, 1999 (JP) .......................................... 11-288264

(51) Int. Cl.$^7$ ............................................... B60T 13/14
(52) U.S. Cl. ........................................... 60/552; 60/593
(58) Field of Search ......................... 60/552, 545, 593, 60/582

(56) References Cited

U.S. PATENT DOCUMENTS

| | | | |
|---|---|---|---|
| 4,620,750 A | | 11/1986 | Leiber |
| 4,655,511 A | * | 4/1987 | Leiber .......................... 60/545 |
| 4,779,422 A | * | 10/1988 | Brown .......................... 60/555 |
| 4,874,207 A | * | 10/1989 | Nishii et al. ................... 60/545 |
| 4,903,487 A | | 2/1990 | Leiber |
| 5,234,086 A | * | 8/1993 | Matsuda et al. ........... 60/547.1 |
| 5,951,116 A | * | 9/1999 | Nagasaka et al. ............. 60/545 |

FOREIGN PATENT DOCUMENTS

| | | |
|---|---|---|
| DE | 38 21 225 | 2/1989 |
| GB | 2 128 279 | 4/1984 |

* cited by examiner

Primary Examiner—Edward K. Look
Assistant Examiner—Igor Kershteyn
(74) Attorney, Agent, or Firm—Kanesaka & Takeuchi

(57) ABSTRACT

In a brake booster of the present invention, by depression of a brake pedal 3, an input shaft 4 travels to the left, a pedal input converter generates thrust, and a valve element 5a moves to the left. A valve passage $5a_1$ is shut off from a valve passage $5b_1$ and a valve passage $5a_2$ is connected to a valve passage $5b_2$ so as to develop output pressure Pr at an output port 5c of a control valve 5 because of the pressure of a pressure source. The output pressure Pr is supplied to a wheel cylinder 7, thereby actuating the brake. At this point, since the displacement of the input shaft 4 required for operating the control valve 5 is defined only by the converter 6, the input side is not affected by the brake rigidity of a circuit from the control valve 5 to the wheel cylinder 7. The output pressure Pr of the control valve 5 acts on the valve element 5a through a first reaction receiving portion 8 and is regulated to pressure proportional to the thrust of the converter 6. The second reaction force is transmitted to a driver through a second reaction receiving portion 9. The control of the output can be conducted during the operation regardless of the input of the input side and the respective characteristics can be varied without being affected by the output side.

4 Claims, 14 Drawing Sheets

BRAKE BOOSTER

BACKGROUND OF THE INVENTION

The present invention relates to a brake booster, which boosts operating force exerted on an operating means with working fluid pressure, that is controlled by a control valve, into predetermined magnitude to output intensified force and, more particularly, to a brake booster which can set the input travel variously without being affected by the operation of a working unit of a master cylinder and the like operated with the output of the brake booster and can control the output of the brake booster during its operation regardless of the operating force exerted on the operating means.

For example, in a conventional brake system of an automobile, a brake booster has been employed which boosts pedaling force exerted on a brake pedal by fluid pressure of hydraulic fluid into predetermined magnitude to develop large brake fluid pressure. The brake booster functions to provide large braking force from small pedaling force exerted on the brake pedal, thereby securing the braking action and reducing the labor of a driver.

Such conventional brake booster can be roughly classified into a vacuum booster for boosting the pedaling force by negative pressure to actuate the master cylinder, a hydraulic booster for boosting the pedaling force by fluid pressure to actuate the master cylinder, a full-power brake system in which the fluid pressure is directly supplied to the wheel cylinders, and a pneumatic/electromagnetic booster for boosting the pedaling force by compressed air/electromagnetic force to actuate the master cylinder.

FIG. 22 is a schematic illustration of a brake system employing a conventional vacuum booster and FIG. 23 is a schematic illustration of a brake system employing a conventional hydraulic booster.

In the brake system employing the vacuum booster shown in FIG. 22, input force Fi is exerted to an input shaft 4 by depression of a brake pedal 3 so that the input shaft 4 moves in the operative direction. Then, a first valve element 5a of a control valve 5 moves to the left so that an output port 5c of the first valve element 5a is shut off from a low-pressure (L) valve passage $5b_1$ of a second valve element 5b connected to a negative pressure source and is connected to a high-pressure (H) valve passage $5b_2$ of the second valve element 5b connected to the atmospheric air. The atmospheric air is controlled according to the input Fi by the control valve 5 to develop output pressure Pr. The output pressure Pr is supplied to a power chamber 10c of the power cylinder 10 so that a power piston 10b moves to the left to produce output Fp which is boosted pedaling force. A master piston 11a is actuated by the output Fp so that a master cylinder 11 develops master cylinder pressure Pm which is supplied to wheel cylinder 7 as braking fluid pressure Pb, thereby actuating the brake. Reaction force Fm from the master cylinder 11 is modulated as reaction force Fv by a reaction mechanism 8 and is applied to the first valve element 5a. Therefore, the output pressure Pr of the control valve 5 is regulated to balance the reaction force Fv with the input force Fi of the input shaft 4. The reaction force Fv is transmitted to a driver through the input shaft 4 and the brake pedal 3. In the vacuum booster, the first valve element 5a moves together with the input shaft 4 and the second valve element 5b moves together with the power piston 10b.

In the break system employing the hydraulic booster shown in FIG. 23, input force Fi is exerted to an input shaft 4 by depression of a brake pedal 3 so that the input shaft 4 moves in the operative direction. Then, a first valve element 5a of a control valve 5 moves to the left so that an output port 5c of the first valve element 5a is shut off from a low-pressure (L) valve passage $5b_1$ of a second valve element 5b connected to a reservoir and is connected to a high-pressure (H) valve passage $5b_2$ of the second valve element 5b connected to a fluid pressure source. The hydraulic pressure of the fluid pressure source such as a pump and an accumulator is controlled according to the input Fi by the control valve 5 to develop output pressure Pr. The output pressure Pr is supplied to a power chamber 10c of the power cylinder 10 so that a power piston 10b moves to the left to produce output Fp which is boosted pedaling force. A master piston 11a is actuated by the output Fp so that a master cylinder 11 develops master cylinder pressure Pm which is supplied to wheel cylinder 7 as braking fluid pressure Pb, thereby actuating the brake. Reaction force Fm from the master cylinder 11 and reaction force by the output pressure Pr of the control valve 5 are modulated as reaction force Fv by a reaction receiving portion and is applied to the first valve element 5a. Therefore, the output pressure Pr of the control valve 5 is regulated to balance the reaction force Fv with the input force Fi of the input shaft 4. The reaction force Fv is transmitted to a driver through the input shaft 4 and the brake pedal 3. In the hydraulic booster, in the same manner as the vacuum booster, the first valve element 5a moves together with the input shaft 4 and the second valve element 5b moves together with the power piston 10b.

By the way, such conventional brake systems employ various brake controls such as for controlling the braking force during the braking action, for example, Brake Assist Control for increasing the braking force when the braking force is insufficient for emergency brake or the like, and Regenerative Brake Coordination Control to be performed when a regenerative brake system is used to develop braking pressure during the braking action by the service brake system, and automatic brake controls, for example, a brake control for controlling the distance from a vehicle in front, a brake control for avoiding a collision with an obstacle object, and Traction Control (TRC).

Most of such brake controls are normally conducted in a brake circuit between the master cylinder and the wheel cylinders. However, when the brake control is conducted in the brake circuit after the master cylinder, it is required to prevent the travel of the brake pedal or pedaling force from being affected by such brake controls, for instance, for obtaining better operational feeling.

However, in a conventional brake system, the travel of a piston of the master cylinder is fixed by the relation between the master cylinder and wheel cylinders or the relation between the master cylinder and the stroke simulator so that the stroke of an input shaft of the brake booster, i.e. the pedal travel of a brake pedal, depends on the travel of the piston of the master cylinder. That is, the travel for input is affected by the brake controls conducted in the brake circuit after the master cylinder. In the conventional brake system, the aforementioned requirement can not be securely and sufficiently satisfied.

For changing the travel characteristic of the brake pedal as the input side to obtain better operational feeling, the master cylinder and the brake circuit after the master cylinder are also affected so that some modifications on the output side, for instance a size change on the master cylinder, should be required. By the change on the output side, the output characteristic of the brake system is affected. This means that the overall modification on the brake system is required, i.e. large-scale modification is required.

It is further desired that the input side is affected as little as possible by brake circuit which may differ according to the type or size of vehicle.

If the input side and the output side are just separated from each other to produce outputs regardless of the travel of the input side, the input side does not travel so that the travel of the input side can not be ensured.

For this, a full power brake system has been conventionally proposed in which a stroke simulator is provided on the brake circuit after the master cylinder to prevent the travel of the input side from being affected by the brake control after the master cylinder and to ensure the travel of the input side.

This type of full power brake system is shown in FIG. 24, and input force Fi is exerted to an input shaft 4 by depression of a brake pedal 3 so that the input shaft 4 moves in the operative direction. Then, a first valve element 5a of a control valve 5 moves to the left so that an output port 5c of the first valve element 5a is shut off from a low-pressure (L) valve passage $5b_1$ of a second valve element 5b connected to a reservoir and is connected to a high-pressure (H) valve passage $5b_2$ of the second valve element 5b connected to a fluid pressure source. The hydraulic pressure of the fluid pressure source such as a pump and an accumulator is controlled according to the input Fi by the control valve 5 to develop output pressure Pr. The output pressure Pr is supplied to wheel cylinder 7 as braking fluid pressure Pb, thereby actuating the brake. At the same time, the output pressure Pr is also supplied to a power chamber 10c of the power cylinder 10 so that the power piston 10b moves to the left to produce output Fp. The master piston 11a is actuated by the output Fp so that the master cylinder 11 develops master cylinder pressure Pm which is supplied to the stroke simulator 19 whereby the stroke simulator 19 moves to the left, thereby ensuring the travel of the input shaft 4, i.e. the travel of the first valve element 5a. Reaction force Fm from the master cylinder 11 and reaction force by the output pressure Pr of the control valve 5 are modulated as reaction force Fv by a reaction receiving portion and are applied to the first valve element 5a. Therefore, the output pressure Pr of the control valve 5 is regulated to balance the reaction force Fv with the input force Fi of the input shaft 4. The reaction force Fv is transmitted to a driver through the input shaft 4 and the brake pedal 3. In this full power brake system, in the same manner as the vacuum or hydraulic booster, the first valve element 5a moves together with the input shaft 4 and the second valve element 5b moves together with the power piston 10b.

However, to prepare the additional stroke simulator, many parts such as a stroke cylinder and an electromagnetic switching valve used for the stroke simulator are required, making the structure complex and increasing the cost.

There is still a problem that the brakes must be securely actuated in case of a fluid pressure source failure even when a stroke simulator is provided.

In a regenerative coordination brake system composed of a combination of a service brake system and a regenerative brake system, when the regenerative brake system is operated during the operation of the brake booster, the braking force produced by the brake booster should be reduced for the braking force produced by the regenerative brake system. In this case, it is desired to reduce the output of the brake booster to a value obtained by subtracting the output of the regenerative brake system from the output of the brake booster. In a brake system composed of a combination of a service brake system and a brake assist system, it is desired to increase the output of the brake booster to intensify the braking force produced by the brake booster in such case that brake assist operation is needed, for example, a case that a driver can not depress a brake pedal enough during the operation of the brake booster so as not to produce predetermined braking force.

It is desired that the brake pedal is not affected by the brake control when performed during the braking action.

Further, in a brake system for controlling the distance from a vehicle in front, a control for holding the distance constant is conducted by automatically actuating the brake when the distance becomes short during running. In a brake system for avoiding a collision, a control for avoiding a collision with an obstacle object is conducted by automatically actuating the brake when there is a possibility of collision with the obstacle object. Furthermore, in a traction control system, a control for cancelling a slipping tendency is conducted to ensure the secure starting by automatically braking driving wheels when the driving wheel(s) is in slipping tendency at the starting.

It is desired that the brake pedal is not affected when the automatic braking is conducted as mentioned above.

Further, it is desired that such a system for controlling the braking force during braking action or controlling the automatic braking can be manufactured with a simple structure.

Moreover, it is desired that the input versus travel characteristic, the input versus braking pressure characteristic, or the travel versus braking pressure characteristic is allowed to be varied according to the condition of a vehicle with a simple structure.

SUMMARY OF THE INVENTION

It is an object of the present invention to provide a brake booster in which a brake operating means is not affected or is hardly affected by the control of the braking force when performed during the braking action.

It is another object of the present invention to provide a brake booster of which the input-output characteristics such as the input versus braking pressure characteristic, the input versus travel characteristic, or the travel versus braking pressure characteristic is allowed to be varied without large-scale modification.

It is still another object of the present invention to provide a brake booster of which the output can be controlled regardless of the input of an input member during operation.

It is yet another object of the present invention to provide a brake booster which can achieve the aforementioned objects and still can be small-sized and inexpensive.

It is still yet another object of the present invention to provide a brake booster which can achieve the aforementioned objects and still allows the brakes to be securely actuated in case of a fluid pressure source failure.

To achieve the aforementioned objects, the present invention provides a brake booster comprising at least a housing, an input shaft which is actuated by input applied through the operation of a brake operating means, and a control valve which is disposed in said housing and is operated by the actuation of said input shaft to regulate the pressure of a pressure source according to the operational input (operating travel, operating force) of the brake operating means to output the regulated pressure, wherein said control valve has at least a first valve element and a second valve element, said first valve element is moved relative to said second valve element by the actuation of said input shaft and is subjected to the output pressure of said control valve in a direction opposite to the actuating force of said input shaft, and said second valve element is fixed to said housing, the brake booster being characterized by further comprising an operational input converting means which is disposed between said input shaft and said first valve element and is at least partially displaced by the input of said input shaft to convert the operational input of said brake operating means to actuating force for actuating said first valve element, and characterized in that the output pressure of said control valve acts on said input shaft in the direction opposite to the operational input of said brake operating means.

The brake booster of the present invention is characterized in that said operational input converting means comprises an elastic member disposed between said input shaft and said first valve element, and said elastic member converts the operational input of said brake operating means to said actuating force and transmits said actuating force to said first valve element.

Further, the brake booster of the present invention is characterized in that said operational input converting means comprises a displacement detector for detecting displacement of said input shaft, and an actuator for actuating said first valve element according to a signal from said displacement detector.

Further, the brake booster of the present invention is characterized in that said operational input converting means has a stroke means which travels according to the displacement of said input shaft.

The brake booster of the present invention is characterized by further comprising a power cylinder which is operated by the output pressure of said control valve to develop braking pressure.

The brake booster of the present invention is characterized by further comprising an operating member which is disposed on said input shaft to actuate said power cylinder by way of the operation of said brake operating means when said pressure source fails.

The present invention further provides a brake booster comprising at least a housing, an input shaft which is actuated by input applied through the operation of a brake operating means, and a control valve which is disposed in said housing and is operated by the actuation of said input shaft to regulate the pressure of a pressure source according to the operational input (operating travel, operating force) of the brake operating means to output the regulated pressure, wherein said control valve has at least a first valve element and a second valve element, said first valve element is moved relative to said second valve element by the actuation of said input shaft and is subjected to the output pressure of said control valve in a direction opposite to the actuating force of said input shaft, and said second valve element is fixed to said housing, said brake booster being characterized by further comprising an operational input converting means which is disposed between said input shaft and said first valve element and is at least partially displaced by the input of said input shaft to convert the operational input of said brake operating means to actuating force for operating said first valve element according to the operational input, and a characteristic varying means for allowing the input and output characteristics to be varied.

The brake booster is characterized in that said characteristic varying means has a pressure regulating valve which regulates the output pressure of said control valve or the pressure of said pressure source to output regulated pressure that acts on said first valve element in a direction opposite to the actuating force of the input shaft.

The brake booster is characterized in that said characteristic varying means has a pressure regulating valve which regulates the output pressure of said control valve or the pressure of said pressure source to output regulated pressure that acts on said input shaft in a direction opposite to the operation of said brake operating means.

Further, the brake booster is characterized in that said characteristic varying means has a pressure regulating valve which regulates the output of said control valve or the pressure of said pressure source to output regulated pressure whereby the output of said brake booster is produced.

Furthermore, the brake booster is characterized in that said characteristic varying means has a reaction force producing means which produces a reaction force acting on said first valve element in a direction opposite to the actuating force of said input shaft.

Still further, the brake booster is characterized in that said operational input converting means has a stroke means which travels according to the displacement of said input shaft and said characteristic varying means has a stroke varying means for varying said travel of said stroke means.

In the brake booster of the present invention structured as mentioned above, the input side and the output side thereof can be separated. Therefore, when the control of the braking force is conducted in the brake circuit between the control valve and the brake cylinder during the braking action, the brake operating means tis not affected or at least hardly affected by this control of the braking force.

Further, without being affected by the output side of the brake booster, the input versus braking pressure characteristic, the input versus travel characteristic, or the travel versus braking pressure characteristic can be varied without large-scale modification.

Furthermore, regardless of the input of the input side during the braking action, the control of the braking force can be conducted in the brake circuit between the control valve and the wheel cylinders. Accordingly, the brake booster can be easily and flexibly adopted to such system in which the control of the braking pressure is required during the operation of the brake booster regardless of the operation of the brake operating means, for instance, the control for reducing the braking pressure to be conducted during the operation of a regenerative brake system with a regenerative brake coordination control, and the control for increasing the braking pressure to be conducted during the brake assisting operation by a brake assist system.

Moreover, the operational input converting means moves when converting the pedal input into the actuating force, thereby ensuring the operational travel of the brake operating means. This means that the operational input converting means exhibits the same function as a conventional stroke simulator.

Furthermore, since an elastic member such as a spring or an actuator which detects the displacement of the input shaft and operates according to the displacement detected is employed as the operational input converting means, the brake booster can be small-sized and inexpensive.

In addition, the brake booster allows the brakes to be securely actuated even when the pressure of the pressure source fails.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, embodiments of the present invention will now be described with reference to drawings.

Figure 1:
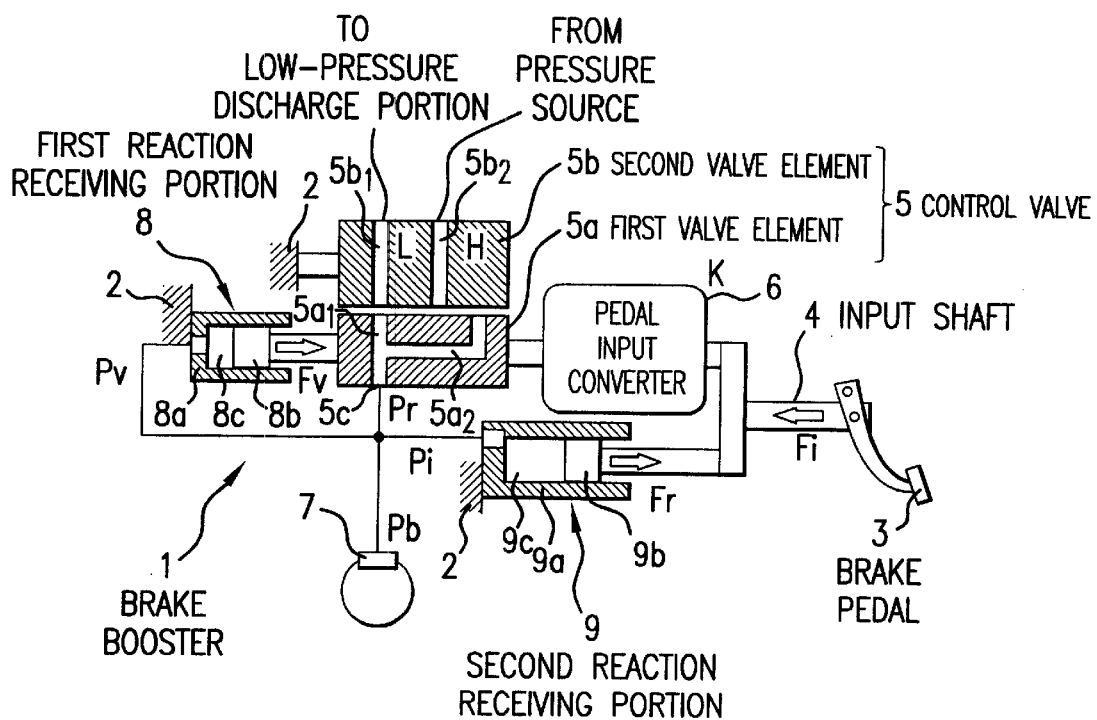
FIG. 1 is a view schematically showing a brake system to which a first embodiment of the brake booster according to the present invention is adopted.

FIG. 1 is a view schematically showing a brake system to which a first embodiment of the brake booster according to the present invention is adopted. In the following description, "the vertical direction" corresponds to the upper-lower direction in any of drawings, and "the front and the rear" correspond to the left and the right in any of the drawings.

As shown in FIG. 1, a brake system to which a brake booster 1 of the first embodiment is adopted comprises a housing 2, a brake pedal 3 as a brake operating means, an input shaft 4 which is actuated by the input transmitted through the brake pedal 3 to displace, a control valve 5 which is actuated by the displacement of the input shaft 4 to output pressure of a pressure source (not shown) controlled according to the input applied by depression of the brake pedal 3 (hereinafter, sometimes referred to as "pedal input") (the travel of the brake pedal, pedaling force), a pedal input converter 6 which at least partially moves by the input of the input shaft 4 to convert the pedal input into actuating force for actuating the control valve 5 by a control ratio k according to the pedal input, a wheel cylinder 7 which produces braking force by receiving the output pressure Pr of the control valve 5, a first reaction receiving portion 8 which produces first reaction force by receiving the output pressure Pr of the control valve 5 and applies the first reaction force to the control valve 5, and a second reaction receiving portion 9 which produces second reaction force by receiving the output pressure Pr of the control valve 5 and applies the second reaction force to the input shaft 4. In this case, the brake booster 1 of this embodiment is composed of the housing 2, the input shaft 4, the control valve 5, the pedal input converter 6, the first reaction receiving portion 8, and the second reaction receiving portion 9.

The control valve 5 comprises a first valve element 5a and a second valve element 5b which are arranged movably relative to each other. The first valve element 5a is provided with an output port 5c of the control valve 5 which always communicates with the wheel cylinder 7 and the first and second reaction receiving portions 8, 9, a first valve passage $5a_1$ which always communicates with the output port 5c and can be connected to or shut off from a low-pressure (L) valve passage $5b_1$ of the second valve element 5b described later, and a second valve passage $5a_2$ which always communicates with the output port 5c and can be connected to or shut off from a high-pressure (H) valve passage $5b_2$ of the second valve element 5b. The second valve element 5b is fixedly connected to the housing 2 of the brake booster 1 and is provided with the low-pressure (L) valve passage $5b_1$ always communicating with a low-pressure discharge portion such as a reservoir (not shown) for discharging the operational pressure of the brake booster 1 and the high-pressure (H) valve passage $5b_2$ always communicating with a pressure source (not shown), an external pressure source, for developing high pressure as the operational pressure for operating the brake booster 1.

The first valve element 5a can take an inoperative position, shown in FIG. 1, where it connects the first valve passage $5a_1$ to the low-pressure (L) valve passage $5b_1$ and shuts off the second valve passage $5a_2$ from the high-pressure (H) valve passage $5b_2$, and an operative position where it shuts off the first valve passage $5a_1$ from the low-pressure (L) valve passage $5b_1$ and connects the second valve passage $5a_2$ to the high-pressure (H) valve passage $5b_2$. The first valve element 5a can shift from the inoperative position to the operative position by moving to the left relative to the second valve element 5b. When any braking action is not taken, the first valve element 5a is always biased to be kept in the inoperative position by a biasing means (not shown).

The pedal input converter 6 is disposed between the input shaft 4 and the first valve element 5a of the control valve 5. The pedal input converter 6 converts the pedal input transmitted from the brake pedal 3 through the input shaft 4 into actuating force proportional to the pedal input, and applies the actuating force to the first valve element 5a to actuate the first valve element 5a. Employed as this pedal input converter 6 is an elastic member such as a spring or an actuator which detects the displacement of the input shaft 4 and operates according to the displacement detected. However, the pedal input converter 6 is not limited thereto and may be any which can convert the input of the input shaft 4 (or the pedal input of the brake pedal 3) into thrust for actuating the first valve element 5a.

The first reaction receiving portion 8 comprises a cylinder member 8a fixed to the housing 2, a first reaction piston 8b which is connected to the first valve element 5a and is fluid-tightly and slidably disposed in the cylinder member 8a, and a first reaction chamber 8c defined in the cylinder member 8a by the first reaction piston 8b. Supplied into the first reaction chamber 8c is the output pressure Pr of the control valve 5. The output pressure Pr in the first reaction chamber 8c acts on the first reaction piston 8b whereby the first reaction piston 8b produces first reaction force acting on the first valve element 5a.

The second reaction receiving portion 9 comprises a cylinder member 9a fixed to the housing 2, a second reaction piston 9b which is connected to the input shaft 4 and is fluid-tightly and slidably disposed in the cylinder member 9a, and a second reaction chamber 9c defined in the cylinder member 9a by the second reaction piston 9b. Supplied into the first reaction chamber 9c is the output pressure Pr of the control valve 5. The output pressure Pr in the second reaction chamber 9c acts on the second reaction piston 9b whereby the second reaction piston 9b produces second reaction force acting on the input shaft 4.

The brake system employing the brake booster 1 of the first embodiment is of a full power type in which the pressure at the output port 5c of the first valve element 5a, i.e. the output pressure Pr of the control valve 5, is directly supplied to the wheel cylinder 7.

Hereinafter, description will be made as regard to the operation of the brake system with the brake booster of the first embodiment structured as mentioned above.

In the inoperative state, shown in FIG. 1, of the brake booster 1 when the brake pedal 3 is not depressed, the first valve element 5a is in the inoperative position where the first valve passage $5a_1$ is connected to the low-pressure (L) valve passage $5b_1$ and the second valve passage $5a_2$ is shut off from the high-pressure (H) valve passage $5b_2$. Therefore, the wheel cylinder 7, the first reaction receiving portion 8, and the second reaction receiving portion 9 are connected to the low-pressure discharge portion through the output port 5c, the first valve passage $5a_1$, and the low-pressure (L) valve passage $5b_1$, respectively so that no pressure is supplied to the wheel cylinder 7, the first reaction receiving portion 8, and the second reaction receiving portion 9.

As the brake pedal 3 is depressed, the pedal input is transmitted to the input shaft 4, so the input shaft 4 moves (travels) to the left according to the input. Then, the pedal input converter 6 converts the input of the input shaft 4 (i.e. the pedal input) into thrust (actuating force) according to the input of the input shaft and applies this thrust to the first valve element 5a to press the first valve element 5a. Then, the first valve element 5a moves to the left relative to the second valve element 5b and becomes in the operative position where the first valve passage $5a_1$ is shut off from the low-pressure (L) valve passage $5b_1$ and the second valve passage $5a_2$ is connected to the high-pressure (H) valve passage $5b_2$. That is, the control valve 5 is switched so that output pressure Pr is developed at the output port 5c by the pressure from the pressure source and the output pressure Pr is supplied as braking pressure to the wheel cylinder 7. Therefore, the wheel cylinder 7 produces braking force, thereby actuating the brake. Since the second valve element 5b is fixed and the first valve element 5a moves regardless of the brake rigidity in the brake circuit between the control valve 5 and the wheel cylinder 7, the travel of the input shaft 4 required for actuating the control valve 5 is defined only by the pedal input converter 6. Therefore, the travel of the input shaft 4 is not affected by the brake rigidity in the brake circuit between the control valve 5 and the wheel cylinder 7.

The output pressure Pr of the control valve 5 is also supplied to the first and second reaction chambers 8c, 9c of the first and second reaction receiving portions 8, 9 at the same time. By the output pressure Pr supplied to the first reaction chamber 8c, the first reaction piston 8b produces first reaction force. Since the first reaction force acts on the first valve element 5a, the first valve element 5a is pressed back or returned so that the output pressure Pr of the control valve 5 is regulated to be balanced with the thrust of the pedal input converter 6, i.e. correspond to the pedal input. Accordingly, the braking pressure to be supplied to the wheel cylinder 7 is proportional to the pedal input. This means that the braking force produced by the wheel cylinder 7 is also proportional to the pedal input. On the other hand, by the output pressure Pr supplied to the second reaction chamber 9c, the second reaction piston 9b produces second reaction force. Since the second reaction force acts on the input shaft 4 in a direction opposite to the input of the input shaft 4, the second reaction force is transmitted to the driver.

As the depression of the brake pedal 3 is released, the brake pedal 3 is returned to the inoperative position so that the input shaft 4 moves to the right to return to its inoperative position. Since the input of the input shaft 4 is therefore cancelled, the thrust generated by the pedal input converter 6 is also cancelled. Therefore, the first valve element 5a returns to the inoperative position where the second valve passage $5a_2$ of the first valve element 5a is shut off from the high-pressure (H) valve passage $5b_2$ and the first valve passage $5a_1$ is connected to the low pressure (L) valve passage $5b_1$. In this position, the output pressure Pr of the control valve 5 is discharged to the low-pressure discharge portion and the output pressure Pr supplied to the wheel cylinder 7, the first reaction chamber 8c, and the second reaction chamber 9c is also discharged to the low-pressure discharge portion. Therefore, the wheel cylinder 7 is inoperative, thereby cancelling the braking force and cancelling the reaction force. In this manner, the operation of the brake is cancelled.

According to the brake booster 1 of the first embodiment, the input side and the output side thereof are separated. Therefore, when the control of the braking force is conducted in the brake circuit between the control valve 5 and the wheel cylinder 7 during the braking action, the brake pedal 3 is not affected or at least hardly affected by this control of the braking force.

Without being affected by the output slide of the brake booster 1, the input versus braking pressure characteristic, the input versus travel characteristic, or the travel versus braking pressure characteristic can be varied without large-scale modification.

Further, regardless of the input of the input side during the braking action, the control of the braking force can be conducted in the brake circuit between the control valve 5 and the wheel cylinder.

Furthermore, the pedal input converter 6 moves when converting the pedal input into the actuating force, thereby ensuring the displacement of the input shaft 4 (i.e. the travel of the brake pedal). This means that the pedal input converter 6 exhibits the same function as a conventional stroke simulator, thus ensuring the travel of the brake pedal and also allowing the pedal travel to be set variously without being affected by the condition of the output side after the control valve 5.

In addition, since an elastic member such as a spring or an actuator which detects the displacement of the input shaft 4 and operates according to the displacement detected is employed as the pedal input converter 6, the brake booster 1 can be small-sized and inexpensive.

Figure 2:
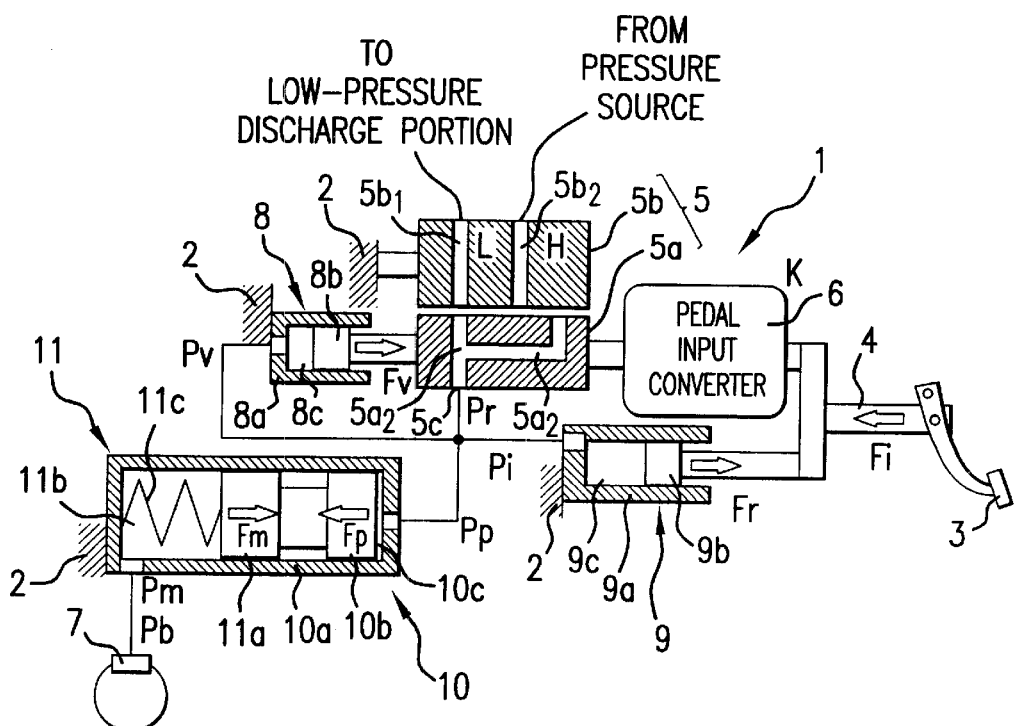
FIG. 2 is a view similar to FIG. 1 but schematically showing a brake system to which a second embodiment of the present invention is adopted.

FIG. 2 is a view similar to FIG. 1 schematically showing a second embodiment of the present invention. It should be noted that, for the description of the following embodiments, parts of the following embodiment similar or corresponding to the parts of the prior embodiment will be marked by the same reference numerals and the detail description of the parts will be omitted.

Though the brake booster 1 of the first embodiment described above is used in the full-power type brake system in which the output pressure Pr of the control valve 5 operates directly the wheel cylinder 7, a brake booster 1 of this second embodiment is used in a brake system in which the output pressure Pr of the control valve 5 operates directly a power piston not the wheel cylinder 7 and the output of the power piston operates a master piston to develop master cylinder pressure so that the wheel cylinder 7 is operated by the master cylinder pressure, i.e. a brake system of a type that a hydraulic booster and a master cylinder are combined.

That is, as shown in FIG. 2, the brake booster 1 of the second embodiment is similar to the brake booster shown in FIG. 1, but further including a power cylinder 10 and a master cylinder 11 which are disposed between the output port 5c of the first valve element 5a and the wheel cylinder 7.

The power cylinder 10 comprises a cylinder member 10a which is common to the master cylinder 11, a power piston 10b which is fluid-tightly and slidably disposed in the cylinder member 10a and is actuated by the output pressure Pr of the control valve 5, and a power chamber 10c which is defined in the cylinder member 10a by the power piston 10b and to which the output pressure Pr of the control valve 5 is supplied.

The master cylinder 11 comprises the cylinder member 10a which is common to the power cylinder 10, a master piston 11a which is fluid-tightly and slidably disposed in the cylinder member 10a and is actuated by the output of the power piston 10b, a chamber 11b which is defined in the cylinder member 10a by the master piston 11a and in which master cylinder pressure is developed when the master piston 11a is actuated, and a return spring 11c which always biases the master piston 11a and the power piston 10b in the inoperative direction.

The other structures of the brake booster 1 of the second embodiment and the brake system thereof are the same as those of the aforementioned first embodiment.

Hereinafter, description will be made as regard to the operation of the brake system with the brake booster of the second embodiment structured as mentioned above. Though the control valve 5 produces output pressure Pr proportional to the pedal input during the braking action in the same manner as the first embodiment, the output pressure Pr is supplied into the power chamber 10c and acts on the power piston 10b. The power piston 10b is thus actuated so that the power cylinder 10 produces output. The master piston 11a is actuated by the output of the power cylinder 10 so that the master cylinder 11 develops master cylinder pressure. The master cylinder pressure is then supplied to the wheel cylinder 7 as braking pressure, thereby actuating the brake like the first embodiment. At this point, the braking force produced by the wheel cylinder 7 is also proportional to the pedal input.

In the brake booster 1 of the second embodiment, since the second valve element 5b is fixed in the same manner as the aforementioned first embodiment and the first valve element 5a moves regardless of the travel of the master piston 11a (i.e. the brake rigidity in the brake circuit between the master cylinder 11 and the wheel cylinder 7), the travel of the input shaft 4 is defined only by the pedal input converter 6. Therefore, the travel of the input shaft 4 of the second embodiment is not affected by the travel of the master piston 11a.

The other actions of the brake booster 1 of the second embodiment and the brake system thereof are the same as those of the first embodiment.

The effects of the brake booster 1 of the second embodiment are substantially the same as those of the first embodiment.

Figure 3:
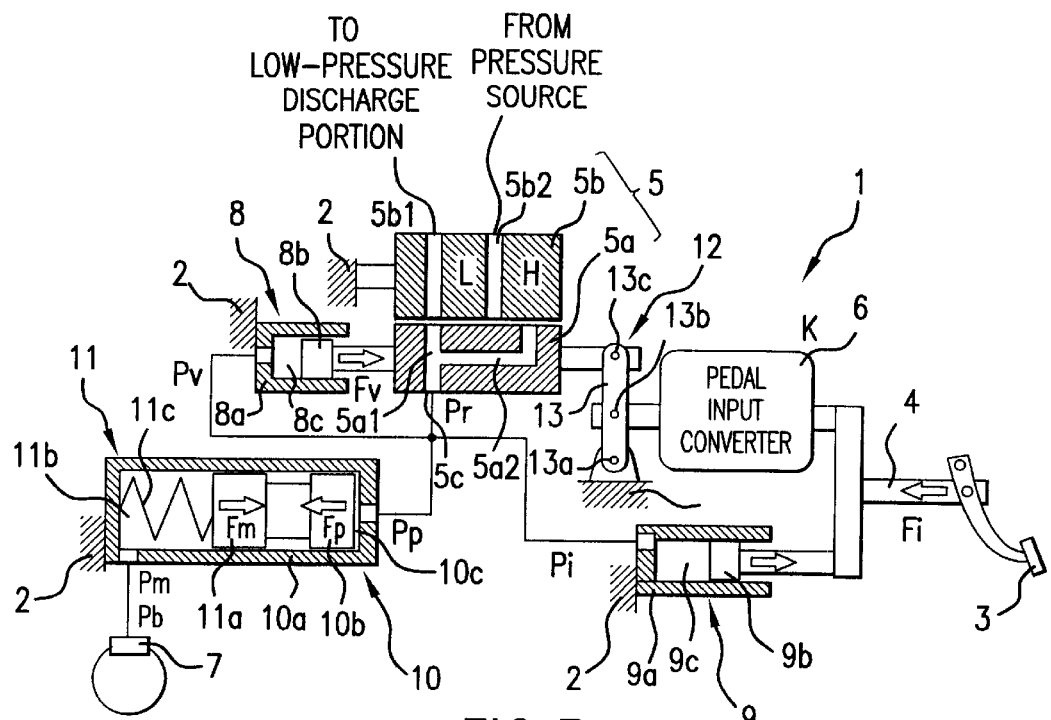
FIG. 3 is a view similar to FIG. 1 but schematically showing a brake system to which a third embodiment of the present invention is adopted.

FIG. 3 is a view similar to FIG. 1, schematically showing the third embodiment of the present invention.

Though the thrust of the pedal input converter 6 directly acts on the first valve element 5a in the brake booster 1 of the second embodiment, the thrust of the pedal input converter 6 is reduced for acting on the first valve element 5a and the travel of the input shaft 4 required to switch the control valve 5 from the low-pressure (L) valve passage $5b_1$ to the high-pressure (H) valve passage $5b_2$, i.e. the pedal travel of the brake pedal 3, is decreased in a brake booster 1 of the third embodiment.

That is, as shown in FIG. 3, the brake booster 1 of the third embodiment is similar to the brake booster 1 shown in FIG. 2 but further including a link mechanism 12 disposed between the pedal input converter 6 and the first valve element 5a. The link mechanism 12 has a lever 13 of which one end is pivotably fixed to the housing 2. The first valve element 5a is pivotably fixed to the other end of the lever 13 and an output-side portion of the pedal input converter 6 is pivotably fixed to a predetermined position between the ends of the lever 13.

The other structures of the brake booster 1 of the third embodiment and the brake system thereof are the same as those of the second embodiment.

Hereinafter, description will be made as regard to the operation of the brake system with the brake booster 1 of the third embodiment structured as mentioned above. The pedal input converter 6 converts the pedal input into thrust proportional to the pedal input during the braking action in the same manner as the second embodiment. By the thrust, the lever 13 pivots so as to move the first valve element 5a to the left so that the control valve 5 is switched from the low-pressure (L) valve passage $5b_1$ to the high-pressure (H) passage $5b_2$ in the same manner as any of the aforementioned embodiments.

At this point, the thrust of the pedal input converter 6 is reduced by a lever ratio (the distance from a pivot point 13a of the lever 13 on the housing 2 to a pivot point 13b of the output side of the pedal input converter 6/the distance from the pivot point 13a of the lever 13 on the housing 2 to a pivot point 13c of the lever 13 on the first valve element 5a) and is transmitted to the first valve element 5a. This means that the thrust acting on the first valve element 5a is weakened. On the other hand, the travel of the output side of the pedal input converter 6 is increased by a lever ratio inverse from the above-mentioned lever ratio and is transmitted to the first valve element 5a so that the leftward travel of the first valve element 5a is larger than the travel of the output side of the pedal input converter 6. That is, the travel of the output side of the pedal input converter 6, i.e. the travel of the input shaft 4, is decreased in comparison to the travel of the first valve element 5a required for switching the control valve from the low-pressure (L) valve passage $5b_1$ to the high-pressure (H) valve passage $5b_2$.

In the brake booster 1 of the third embodiment, since the second valve element 5b is fixed in the same manner as the aforementioned first embodiment, the pivot point 13a of the one end of the lever 13 is fixed, and the first valve element 5a moves regardless of the travel of the master piston 11a, the travel of the input shaft 4 is defined only by the pedal input converter 6 and is not affected by the travel of the master piston 11a.

The other actions of the brake booster of the third embodiment and the brake system thereof are the same as those of the second embodiment.

The effects of the brake booster 1 of the third embodiment are substantially the same as those of the first embodiment.

It should be noted that the link mechanism 12 of the third embodiment can be adopted to the aforementioned first embodiment in the same manner.

Figure 4:
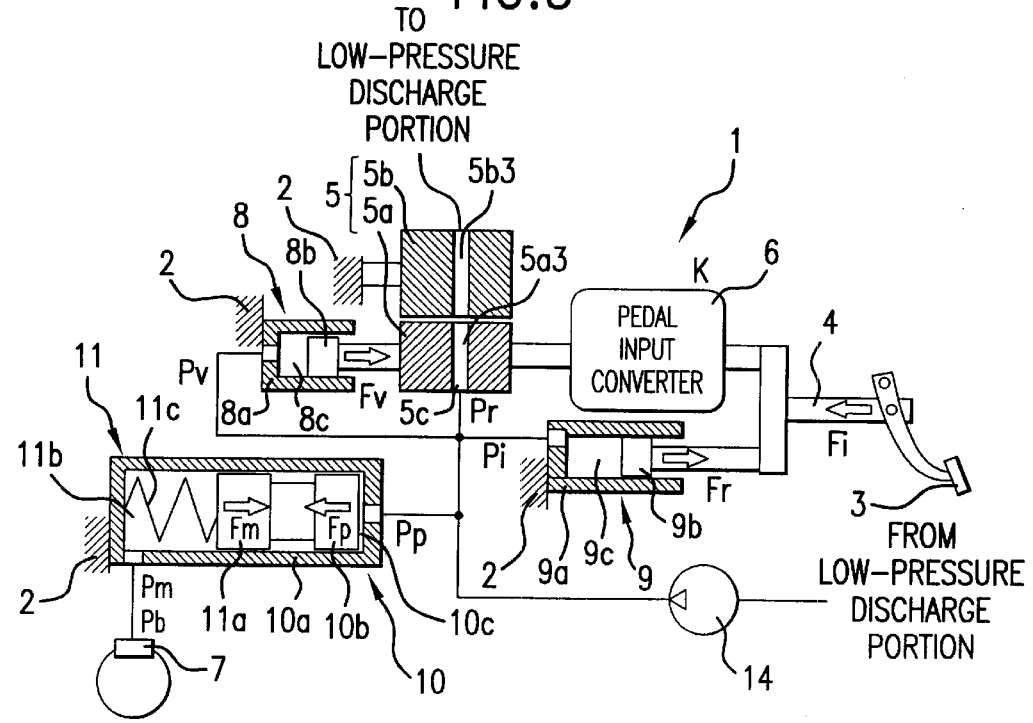
FIG. 4 is a view similar to FIG. 1 but schematically showing a brake system to which a fourth embodiment of the present invention is adopted.

FIG. 4 is a view similar to FIG. 1 schematically showing the fourth embodiment of the present invention.

Though the output pressure Pr of the control valve 5 is developed at the output port 5c of the first valve element 5a by switching the control valve 5 from the low-pressure (L) valve passage $5b_1$ to the high-pressure (H) valve passage $5b_2$ formed in the second valve element 5b by way of the movement of the first valve element 5a in the brake booster 1 of the aforementioned second embodiment, the output pressure Pr of the control valve 5 is developed at the output port 5c of the first valve element 5a during the braking action by actuating a pump and shutting off the pump from the low-pressure discharge portion by way of the movement of the first valve element 5a so as to develop pump discharge pressure in a brake booster 1 of the fourth embodiment.

That is, a third valve passage $5a_3$ and a fourth valve passage $5b_3$ are formed in the first valve element 5a and the second valve element 5b, respectively as shown in FIG. 4, instead of the first and second valve passages $5a_1$, $5a_2$ of the first valve element 5a and the low-pressure (L) and high-pressure (H) valve passages $5b_1$, $5b_2$ of this second valve element 5b in the control valve 5 shown in FIG. 2. The third and fourth valve passages $5a_3$, $5b_3$ are connected to each other when any braking action is not taken and are shut off from each other by way of leftward movement of the first valve element 5a.

The third valve passage $5a_3$ of the first valve element 5a has an output port 5c. A pump 14 is provided in a fluid pressure line connecting the output port 5c and the power chamber 10c. This means that the pump 14 as a pressure source is provided near the power cylinder after the control valve 5. The pump 14 is activated by a pedal depression signal from a well-known detection sensor (not shown) (e.g. a pedaling force detection sensor, pedal travel detection sensor) which detects when the brake pedal 3 is depressed.

The other structures of the brake booster 1 of the fourth embodiment and the brake system thereof are the same as those of the second embodiment.

Hereinafter, description will be made as regard to the operation of the brake system with the brake booster 1 of the fourth embodiment structured as mentioned above.

In the inoperative state as shown in FIG. 4, the third and fourth valve passages $5a_3$, $5b_3$ are connected to each other as mentioned above.

When the braking action is taken i.e. the brake pedal 3 is depressed, the pump 14 is activated by the pedal depression signal. The pedal input converter 6 converts the pedal input into thrust proportional to the pedal input during the braking action in the same manner as the second embodiment. By the thrust, the first valve element 5a is moved to the left. By this movement of the first valve element 5a, the third and fourth valve passages $5a_3$, $5b_3$ are throttled so that the pump 14 develops pump discharge pressure at the output port 5c and the pump discharge pressure becomes the output pressure Pr of the control valve 5. The output pressure Pr of the control valve 5 is proportional to the pedal input, just like any of the aforementioned embodiments.

The output pressure Pr of the control valve 5 is supplied to the first reaction receiving portion 8 to act on the first valve element 5a so that the output pressure Pr is regulated to be proportional to the pedal input of the brake pedal. The output pressure Pr of the control valve 5 is also supplied to the second reaction receiving portion 9 to act on the input shaft 4 as reaction force. This reaction force is transmitted to the driver.

Also in the brake booster 1 of the fourth embodiment, since the second valve element 5b is fixed and the first valve element 5a moves regardless of the travel of the master piston 11a in the same manner as the aforementioned second embodiment, the travel of the input shaft 4 is defined only by the pedal input converter 6 and is not affected by the travel of the master piston 11a.

The other actions of the brake booster 1 of the fourth embodiment and the brake system thereof are the same as those of the second embodiment.

The effects of the brake booster 1 of the fourth embodiment are substantially the same as those of the first embodiment.

It should be noted that the control valve 5 of the fourth embodiment can be adopted to the control valve of any of the aforementioned first and third embodiments in the same manner.

Figure 5:
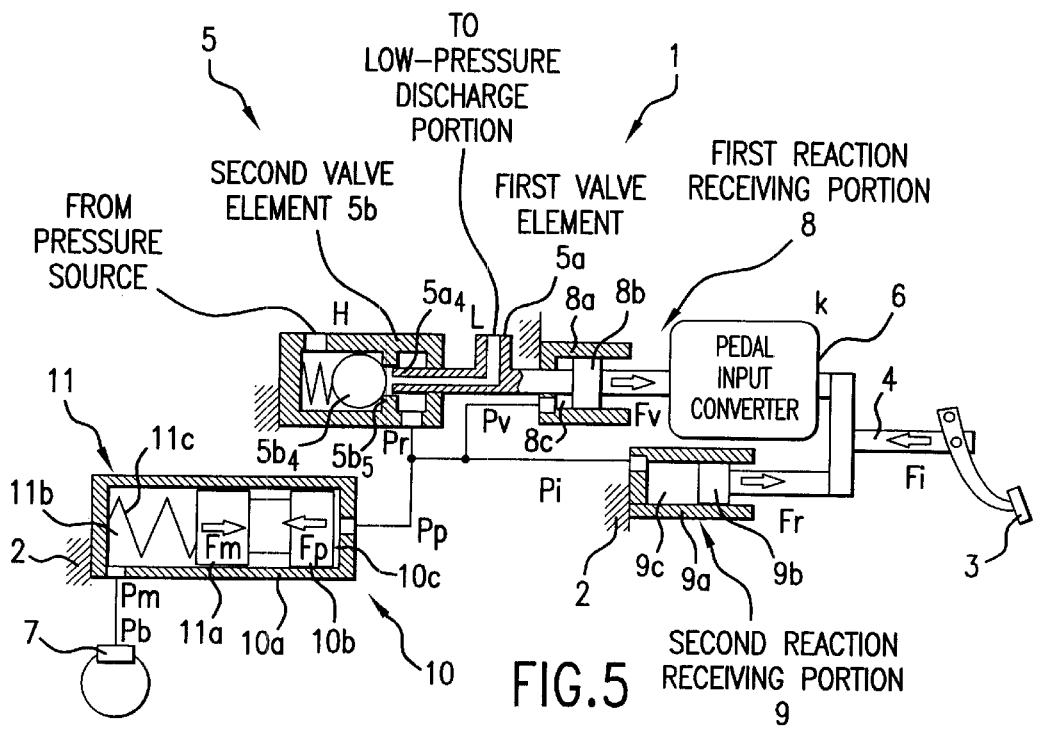
FIG. 5 is a view similar to FIG. 1 but schematically showing a brake system to which a fifth embodiment of the present invention is adopted.

FIG. 5 is a view similar to FIG. 1 schematically showing the fifth embodiment of the present invention.

Though the control valve 5 employed in any of the aforementioned embodiments takes a valve structure of a spool valve type in which the first valve element $5a$ displaces relative to the second valve element $5b$, a control valve 5 employed in the fifth embodiment takes a valve structure of a one-valve body/two-seat type.

That is, as shown in FIG. 5, the first valve element $5a$ of the control valve 5 in the brake booster 1 of the fifth embodiment has a first annular seat $5a_4$ on which a valve ball $5b_4$ described later is seated and a low-pressure passage L which opens inside the first annular seat $5a_4$ and always connects to the low-pressure discharge portion. The second valve element $5b$ has the valve ball $5b_4$, and a second annular seat $5b_5$ on which the valve ball $5b_4$ is seated, a high-pressure passage H which always connects to the pressure source, and further an output port $5c$.

When any braking action is not taken as shown in FIG. 5, the valve ball $5b_4$ is seated on the second annular seat $5b_5$ and is spaced apart from the first annular seat $5a_4$. In this state, the output port $5c$ is shut off from the high-pressure passage H and is connected to the low-pressure passage L. During the braking action, the control valve 5 is switched by the leftward movement of the first valve element $5a$ so that the valve ball $5b_4$ is seated on the first annular seat $5a_4$ and is spaced apart from the second annular seat $5b_5$ and the output port $5c$ is shut off from the low-pressure passage L and is connected to the high-pressure passage H.

In addition, in the brake booster 1 of the fifth embodiment, the first reaction receiving portion 8 is disposed between the pedal input converter 6 and the first valve element $5a$. In this case, the first reaction piston $8b$ is disposed between the output side of the pedal input converter 6 and the first valve element $5a$ and can move together with the output side of the pedal input converter 6 and the first valve element $5a$.

The other structures of the brake booster 1 of the fifth embodiment and the brake system thereof are the same as those of the second embodiment.

Hereinafter, description will be made as regard to the operation of the brake system with the brake booster 1 of the fifth embodiment structured as mentioned above. When any braking action is not taken, the valve ball $5b_4$ is seated on the second annular seat $5b_5$ and is spaced apart from the first annular seat $5a_4$ and the output port $5c$ is connected to the low-pressure passage L. Therefore, there is no pressure developed at the output port $5c$.

When the braking action is taken i.e. the brake pedal 3 is depressed, the pedal input converter 6 generates thrust in the same manner as any of the aforementioned embodiments. By this thrust, the first valve element $5a$ is pressed through the first reaction piston $8b$. The first valve element $5a$ thus moves to the left so that the first annular seat $5a_4$ comes in contact with the valve ball $5b_4$ and the valve ball $5b_4$ moves apart from the second annular seat $5b_5$. Therefore, the output port $5c$ is shut off from the low-pressure passage L and is connected to the high-pressure passage H, whereby the control valve 5 develops output pressure Pr at the output port $5c$. The output pressure Pr is supplied to the power chamber $10c$ of the power cylinder 10 and the first and second reaction chambers $8c$, $9c$ of the first and second reaction receiving portions 8, 9, just like the second through fourth embodiments. Accordingly, the output pressure Pr of the control valve 5 is proportional to the pedal input. Since the output pressure Pr is supplied to the power chamber $10c$ as braking pressure, the brake is actuated with the braking force proportional to the pedal input, just like any of the aforementioned embodiment.

As the depression of the brake pedal 3 is released, the first valve element $5a$ moves to the right i.e. toward the inoperative position just like any of the aforementioned embodiments so that the valve ball $5b_4$ comes in contact with the second annular seat $5b_5$ and the first annular seat $5a_4$ moves apart from the valve ball $5b_4$. The output port $5c$ is then shut off from the high-pressure passage H and is connected to the low-pressure passage L. Therefore, the pressures supplied to the power chamber $10c$ and the first and second reaction chambers $8c$, $9c$ are discharged to the low-pressure discharge portion, thereby cancelling the brake.

Also in the brake booster 1 of the fifth embodiment, since the second valve element $5b$ is fixed (though the valve ball $5b_4$ moves, the second valve element $5b$ is fixed as a whole) and the first valve element $5a$ moves regardless of the travel of the master piston $11a$ in the same manner as any of the aforementioned embodiments, the travel of the input shaft 4 is defined only by the pedal input converter 6. Therefore, the travel of the input shaft 4 of the fifth embodiment is also not affected by the travel of the master piston $11a$.

The other actions of the brake booster 1 of the fifth embodiment and the brake system thereof are the same as those of the second embodiment.

The effects of the brake booster 1 of the fifth embodiment are substantially the same as those of the first embodiment.

It should be noted that the control valve 5 and first reaction receiving portion 8 of the fifth embodiment can be adopted to the control valve and the first reaction receiving portion 8 of any of the aforementioned first and third embodiments in the same manner.

Figure 6:
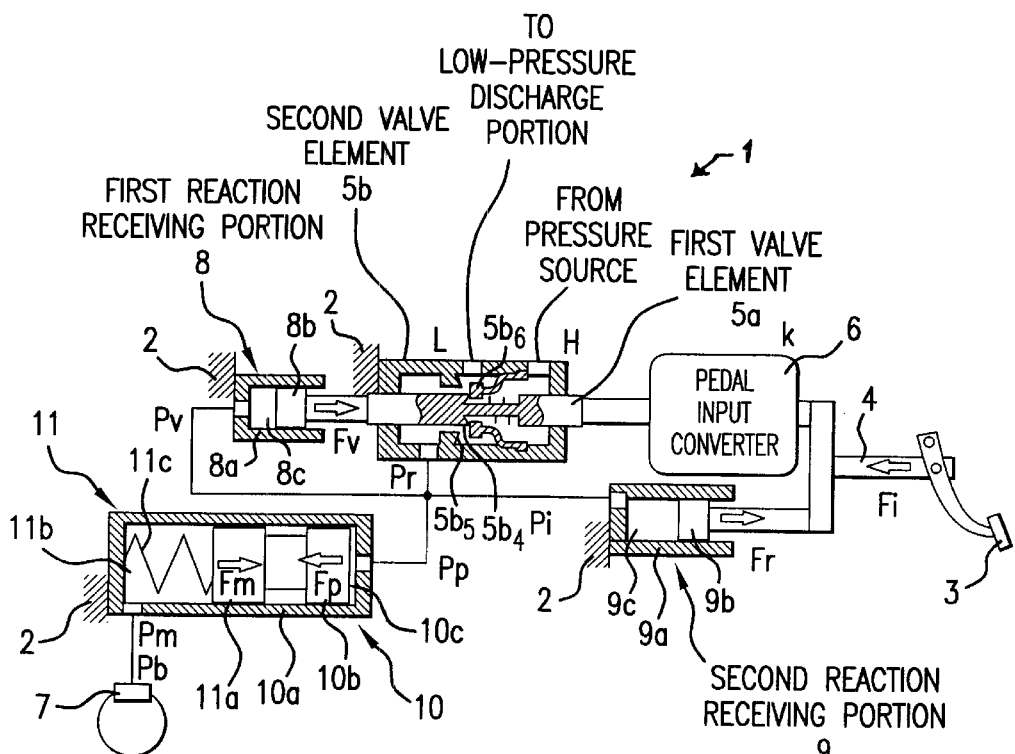
FIG. 6 is a view similar to FIG. 1 but schematically showing a brake system to which a sixth embodiment of the present invention is adopted.

FIG. 6 is a view similar to FIG. 1 schematically showing the sixth embodiment of the present invention.

Though the control valve 5 of one-valve body/two-seat type is composed of the valve ball $5b_4$ and the first and second annular seats $5a_4$, $5b_5$, i.e. the ball valve, in the fifth embodiment, a control valve 5 of one-valve body/two-seat type is composed of a poppet body $5b_6$ and first and second annular seats $5a_4$, $5b_5$.

That is, as shown in FIG. 6, the first valve element $5a$ of the control valve 5 in a brake booster 1 according to the sixth embodiment is provided at its middle portion with the first annular seat $5a_4$ on which the poppet body $5b_6$ described later can be seated. The second valve element $5b$ has the cylindrical poppet body $5b_6$ which is made of elastic material such as rubber, the second annular seat $5b_5$ on which the poppet body $5b_6$ can be seated, a high-pressure passage H which always communicates with the pressure source and a low-pressure passage L which always communicates with the low-pressure discharge portion, and further an output port $5c$.

When any braking action is not taken as shown in FIG. 6, the poppet body $5b_6$ is seated on the first annular seat $5a_4$ and is spaced apart from the second annular seat $5b_5$. In this state, the output port $5c$ is shut off from the high-pressure passage H and is connected to the low-pressure passage L. When the braking action is taken, the first valve element $5a$ moves to the left so as to switch the control valve 5, whereby the poppet body $5b_6$ is seated on the second annular seat $5b_5$ and the first annular seat $5a_4$ moves apart from the poppet body $5b_6$. Therefore the output port $5c$ is shut off from the low-pressure passage L and is connected to the high-pressure passage H.

In the brake booster 1 of the sixth embodiment, the position of the first reaction receiving portion 8 is different from that in the fifth embodiment i.e. it is not positioned between the output side of the pedal input converter 6 and the first valve element 5*a*. The first reaction receiving portion 8 is disposed to the first valve element 5*a* at the opposite side of the pedal input converter 6.

The other structures of the brake booster 1 of the sixth embodiment and the brake system thereof are the same as those of the fifth embodiment.

The operation of the brake system with the brake booster 1 of the sixth embodiment is substantially the same as that of the fifth embodiment and the description for the operation of the fifth embodiment can therefore be read as the description for the operation of the sixth embodiment by substituting the poppet body 5*b*$_6$ for the valve ball 5*b*$_4$, and the second and first annular seats 5*b*$_5$, 5*a*$_4$ for the first and second annular seats 5*a*$_4$, 5*b*$_5$.

The effects of the brake booster 1 of the sixth embodiment are substantially the same as those of the first embodiment.

It should be noted that the control valve 5 of the sixth embodiment can be adopted to the control valve of any of the aforementioned first and third embodiments in the same manner.

Figure 7:
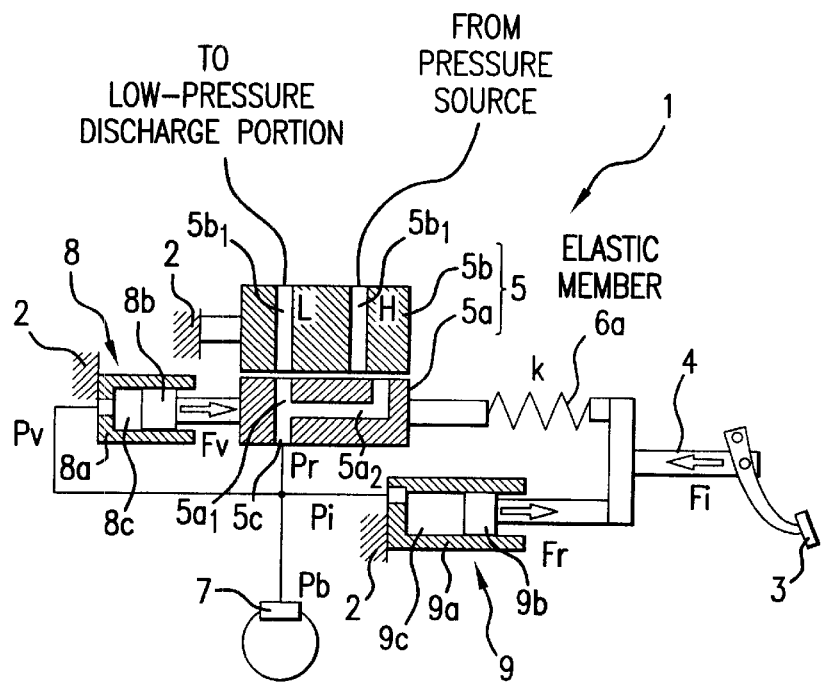
FIG. 7 is a view similar to FIG. 1 but schematically showing a brake system to which a seventh embodiment of the present invention is adopted.

FIG. 7 is a view similar to FIG. 1 schematically showing the seventh embodiment of the present invention.

As shown in FIG. 7, a brake booster 1 of the seventh embodiment employs an elastic member 6*a* such as a coil spring, as the pedal input converter 6 in the aforementioned first embodiment.

The other structures of the brake booster 1 of the seventh embodiment and the brake system thereof are the same as those of the first embodiment.

Hereinafter, description will be made as regard to the operation of the brake system with the brake booster 1 of the seventh embodiment structured as mentioned above. When the brake pedal 3 is depressed to take the braking action, the input shaft 4 displaces to the left just like any of the aforementioned embodiments. By this displacement of the input shaft 4, the elastic member 6*a* deforms according to the amount of displacement of the input shaft 4. The elastic member 6*a* converts its deformation into spring force proportional to the amount of displacement. The spring force functions as the thrust of the pedal input converter 6 in the first embodiment so as to press the first valve element 5*a*. The operation after this is the same as that of the first embodiment When the depression of the brake pedal 3 is released, the input shaft 4 displaces to the right i.e. toward the inoperative position just like any of the aforementioned embodiments. By this displacement of the input shaft 4, the deformation of the elastic member 6*a* is cancelled so that the elastic member 6*a* returns to its initial state. Therefore, the spring force goes out, that is, the thrust goes out. The operation after this is the same as that of the first embodiment.

According to the seventh embodiment, since the elastic member 6*a* such as a spring is employed as the pedal input converter 6, the brake booster 1 can be manufactured in a small size and at a low cost.

The other effects of the brake booster 1 of the seventh embodiment are substantially the same as those of the first embodiment.

It should be noted that the elastic member 6*a* as the pedal input converter 6 of the seventh embodiment can be adopted to the pedal input converter 6 of any of the first through sixth embodiments.

Figure 8:
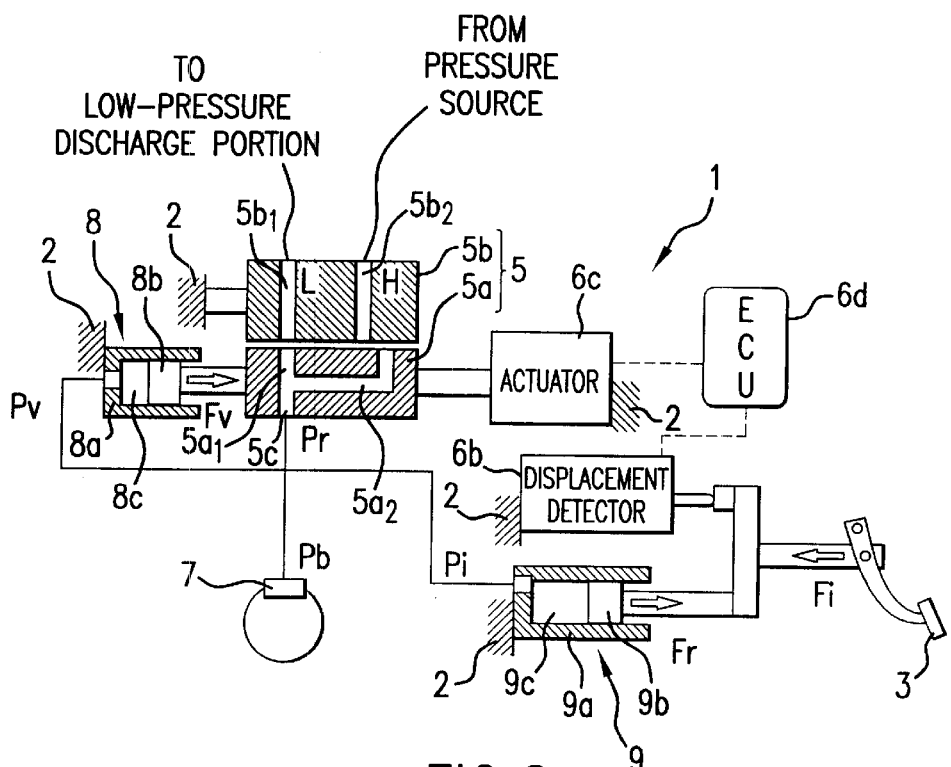
FIG. 8 is a view similar to FIG. 1 but schematically showing a brake system to which an eighth embodiment of the present invention is adopted.

FIG. 8 is a view similar to FIG. 1 schematically showing the eighth embodiment of the present invention.

Though the elastic member 6*a* such as a coil spring is employed as the pedal input converter 6 in the seventh embodiment, a displacement detector 6*b* for detecting the displacement of the input shaft 4, an actuator 6*c* moving the first valve element 5*a*, and an electronic control unit (hereinafter, sometimes referred to as "ECU") 6*d* for controlling the operation of the actuator 6*c* based on a displacement detection signal of the input shaft 4 from the displacement detector 6*b* are employed as the pedal input converter 6 in a brake booster 1 of the eighth embodiment.

The actuator 6*c* may be a hydraulic actuator which is operated by fluid pressure or an electromagnetic actuator. When the actuator 6*c* is a hydraulic actuator, a fluid control solenoid valve (not shown) for controlling the supply and discharge of fluid pressure to the actuator 6*c* is used and is controlled by the ECU 6*d*, whereby the fluid pressure proportional to the displacement of the input shaft 4 i.e. proportional to the pedal input of the brake pedal 3 can be supplied to the actuator 6*c*. When the actuator 6*c* is an electromagnetic actuator, the current for exciting the electromagnetic actuator is controlled to be proportional to the pedal input by the ECU 6*d* and then is supplied to the electromagnetic actuator.

The other structures of the brake booster 1 of the eighth embodiment and the brake system thereof are a the same as those of the first embodiment.

The operation of the brake system with the brake booster 1 of the eighth embodiment structured as mentioned above is substantially the same as that of the seventh embodiment except that instead of the spring force of the elastic member 6*a* of the seventh embodiment, the force produced by the actuator 6*c* acts as the thrust of the pedal input converter 6.

According to the eighth embodiment, since the displacement detector 6*b* and the actuator 6*c* are employed as the pedal input converter 6, the brake booster 1 can be manufactured in a small size and at a low cost.

The effects of the brake booster 1 of the eighth embodiment are substantially the same as those of the first embodiment.

It should be noted that the displacement detector 6*b*, the actuator 6*c*, and the ECU 6*d* of the eighth embodiment can be adopted to pedal input converter 6 of any of the first through sixth embodiments in the same manner.

Figure 9:
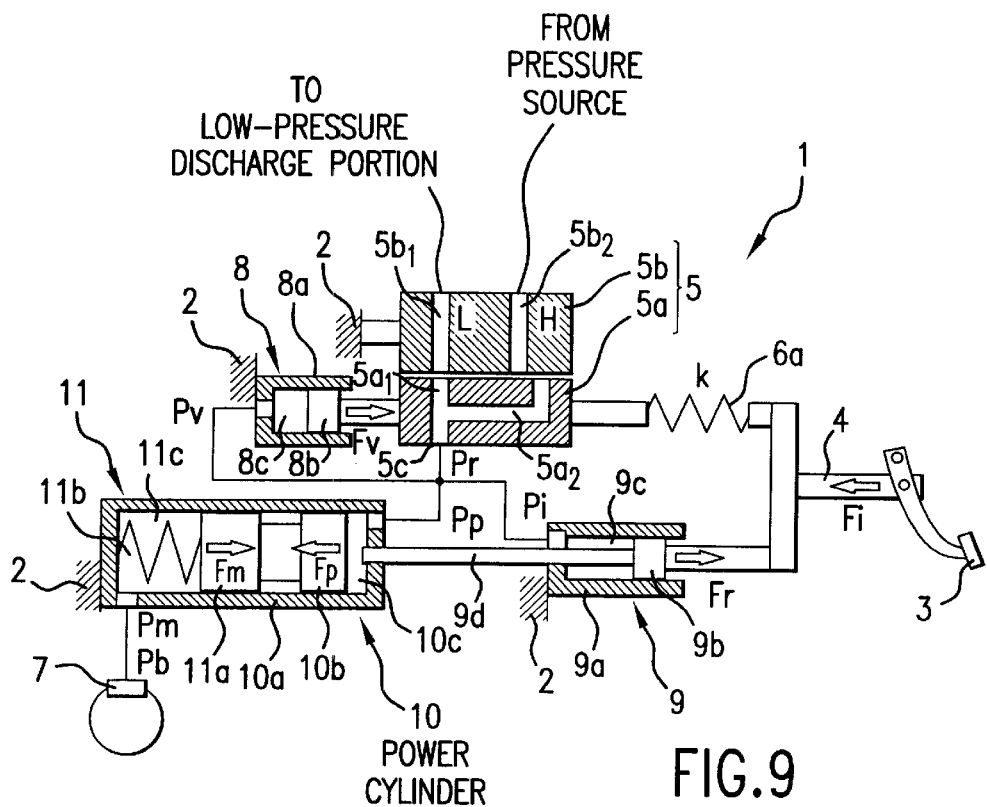
FIG. 9 is a view similar to FIG. 1 but schematically showing a brake system to which a ninth embodiment of the present invention is adopted.

FIG. 9 is a view similar to FIG. 1 schematically showing the ninth embodiment of the present invention.

As shown in FIG. 9, in a brake booster 1 of the ninth embodiment, the pedal input converter 6 using the elastic member 6*a* such as a coil spring of the aforementioned seventh embodiment is applied to the pedal input converter 6 of the brake booster 1 of the second embodiment shown in FIG. 2 and, in addition, the second reaction piston 9*b* of the second reaction receiving portion 9 has an operational rod 9*d* extending toward the power cylinder so as to operate the power piston 10*b*. The operational rod 9*d* fluid-tightly and slidably penetrates both the cylinder member 9*a* of the second reaction receiving portion 9 and the cylinder member 10*a* of the power cylinder 10 such that the end of the operational rod 9*d* enters in the power chamber 10*c* to face the power piston 10*b* with a predetermined space. The predetermined space between the end of the operational rod 9*d* and the power piston 10*b* is designed in such a manner that even when the operational rod 9*d* moves to the left for the normal braking with normal pressure of the pressure source, the end of the operational rod 9*d* does not come in contact with the power piston 10*b*.

The other structures of the brake booster 1 of the ninth embodiment and the brake system thereof are the same as those of the second embodiment.

Hereinafter, description will be made as regard to the operation of the brake system with the brake booster 1 of the ninth embodiment structured as mentioned above. When the pressure of the pressure source is normal, the operation when the braking action is taken is substantially the same as that of the second embodiment except that the thrust of the pedal input converter 6 in the operation of the brake booster 1 of the second embodiment is accomplished by the spring force of the elastic member 6a just like the seventh embodiment. Since when the brake booster 1 is operative, the output pressure Pr of the control valve 5 is received not only by the second reaction piston 9b but also by the end of the operational rod 9d in the power chamber 10c, the reaction force from the second reaction receiving portion 9 acting on the input shaft 41 is not so different from that of the other embodiments without the operational rod 9d.

As the pressure of the pressure source fails, no pressure is supplied from the pressure source so that no pressure is developed at the output port 5c even when the second valve passage $5a_2$ of the first valve element 5a is connected to the high-pressure (H) passage $5b_2$ of the second valve element 5b. The power piston 10b is not actuated with the output pressure Pr of the control valve 5. However, when the brake pedal 3 is depressed with force larger than that for normal braking, the second reaction piston 9b and the operational rod 9d move largely to the left so that the end of the operational rod 9d comes in contact with the power piston 10b and presses the power piston 10b to the left. The power piston 10b moves to the left and presses the master piston 11a. Therefore, just like the case that the pressure of the pressure source is normal, the master cylinder develops master cylinder pressure which is supplied to the wheel cylinder 7 as braking pressure. In this manner, the braking operation can be achieved even when the pressure of the pressure source fails.

By the way, during the braking operation when the pressure of the pressure source fails, the input shaft 4 presses not only the second reaction piston 9b but also the pedal input converter 6. It is preferably designed that the most of the reaction force acting on the input shaft 4 is received by the second reaction receiving portion 9, for instance, by that the pressure receiving area of the second reaction piston 9b of the second reaction receiving portion 9 is set to be larger than the pressure receiving area of the first reaction piston 8b of the first reaction receiving portion 8. This reduces the thrust for the first valve element 5a, with the result that the most of the pedal input can be utilized as force for developing the braking pressure when the pressure of the pressure source fails.

The other actions of the brake system with the brake booster 1 of the ninth embodiment are the same as those of the second embodiment.

According to the ninth embodiment, the brake booster 1 allows the brakes to be securely actuated even when the pressure of the pressure source fails.

The other effects of the brake booster 1 of the ninth embodiment are substantially the same as those of the first embodiment.

The operational rod 9d formed on the second reaction piston 9b of the second reaction receiving portion 9 according to the ninth embodiment can be adopted to the second reaction piston 9b of any of the brake boosters 1 of the third through sixth embodiments and of the brake booster 1 of the brake system in which the power cylinder and the master cylinder are provided just like the second embodiment to the brake system of the eighth embodiment, in such a manner that the end of the operational rod 9d faces the power piston 10b.

Figure 10:
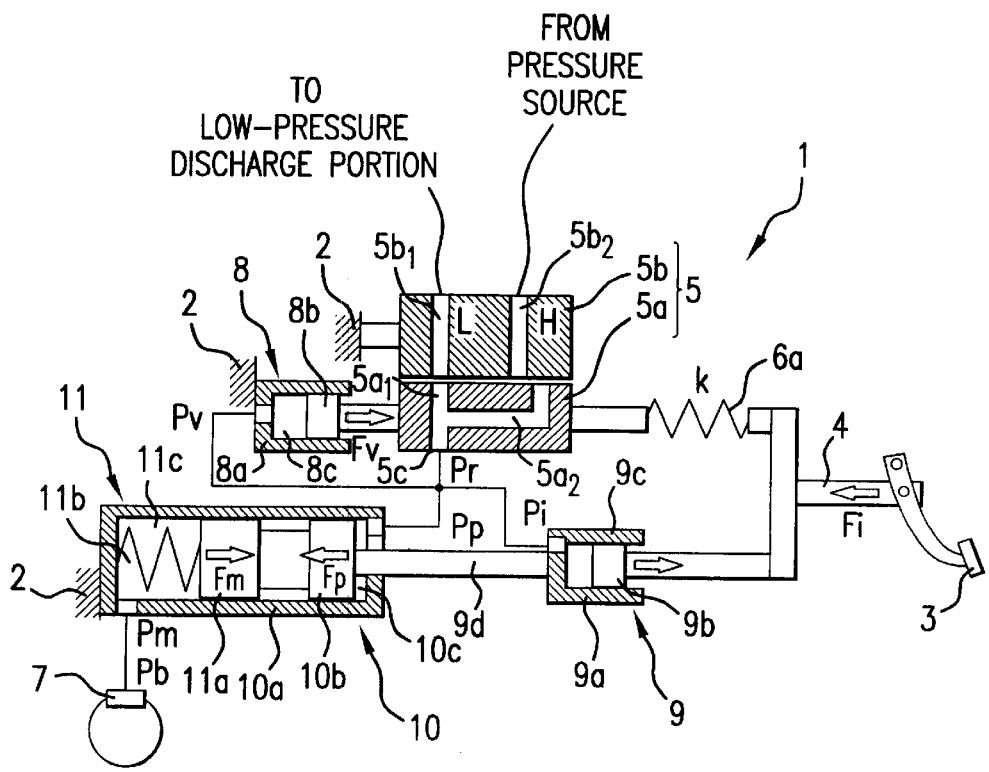
FIG. 10 is a view similar to FIG. 1 but schematically showing a brake system to which a tenth embodiment of the present invention is adopted.

FIG. 10 is a view similar to FIG. 1 schematically showing the tenth embodiment of the present invention.

Though the cylinder member 9a of the second reaction receiving portion 9 is fixed to the housing 2 and the operational rod 9d is disposed on the second reaction piston 9b such that the end thereof faces the power piston 10b in the aforementioned ninth embodiment, the cylinder member 9a of the second reaction receiving portion 9 is movably disposed in a brake booster 1 of the tenth embodiment as shown in FIG. 10. Further in the tenth embodiment, the operational rod 9d is disposed on the cylinder member 9a to fluid-tightly and slidably penetrate the cylinder member 10a of the power cylinder 10 and is connected to the power piston 10b. Therefore, the cylinder member 9a, the operational rod 9d, and the power piston 10b integrally move together.

The other structures of the brake booster 1 of the tenth embodiment and the brake system thereof are the same as those of the ninth embodiment.

Hereinafter, description will be made as regard to the operation of the brake system with the brake booster 1 of the tenth embodiment structured as mentioned above. The operation of the brake booster 1 when the pressure of the pressure source is normal is substantially the same as the operation of the ninth embodiment except that the operational rod 9d moves with the power piston 10b not with the input shaft 4 during the braking action.

The operation of the brake booster 1 when the pressure of the pressure source fails is also substantially the same as the operation of the ninth embodiment except that the input shaft 4 operates the power piston 10b through the second reaction piston 9b, the cylinder member 9a, and the operational rod 9d. In this case, it is also the same as the ninth embodiment that the most of the pedal input is utilized as the force for developing the braking pressure.

The effects of the brake booster 1 of the tenth embodiment are substantially the same as those of the ninth embodiment.

It should be noted that the operational rod 9d may be formed separately from the power piston 10b. In this case, the operational rod 9d and the power piston 10b are always in contact with each other.

Figure 11:
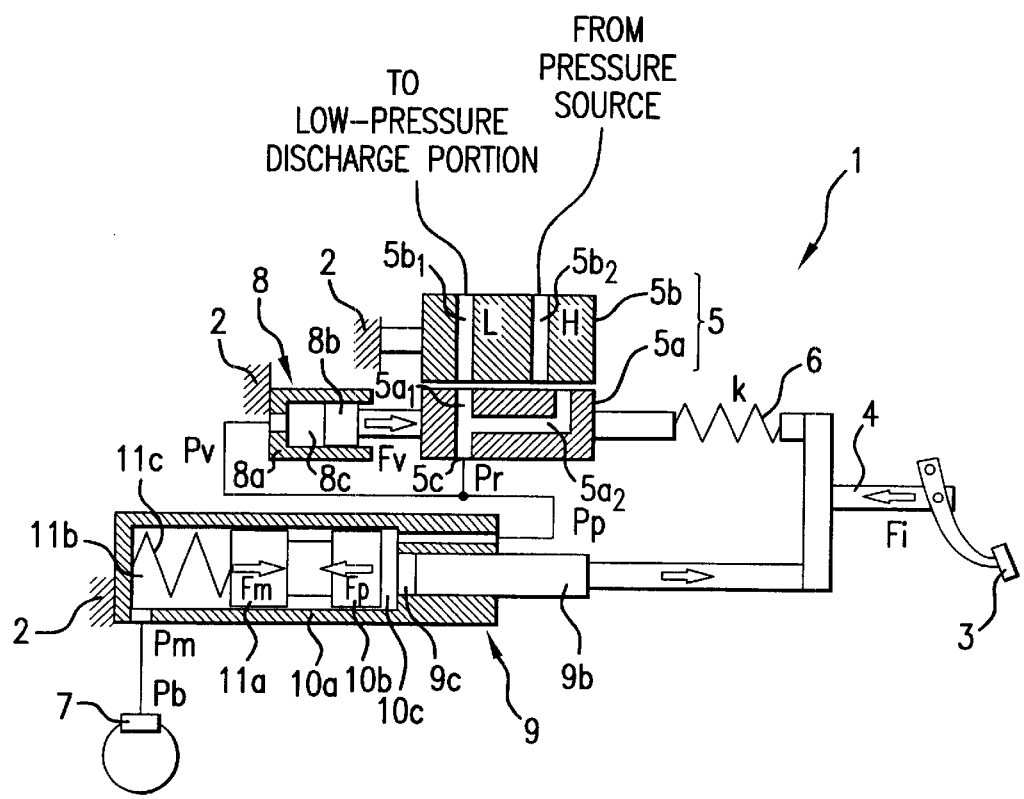
FIG. 11 is a view similar to FIG. 1 but schematically showing a brake system to which an eleventh embodiment of the present invention is adopted.

FIG. 11 is a view similar to FIG. 1 schematically showing the eleventh embodiment of the present invention Though the second reaction chamber 9c of the second reaction receiving portion 9 and the power chamber 10c of the power cylinder 10 are separately provided and the operational rod 9d is disposed on the second reaction piston 9b to extend to the inside of the power chamber 10c in the ninth embodiment, a common chamber can be used as both the second reaction chamber 9c and the power chamber 10c so as to eliminate the operational rod 9d in a brake booster 1 of the eleventh embodiment as shown in FIG. 11.

That is, in the eleventh embodiment, the second reaction chamber 9c is formed in the cylinder member 10a of the power cylinder 10 so as to open the power chamber 10c and the second reaction piston 9b is fluid-tightly and slidably fitted in the cylinder member 10a.

The other structures of the brake booster 1 of the eleventh embodiment and the brake system thereof are the same as those of the ninth embodiment.

Hereinafter, description will be made as regard to the operation of the brake system with the brake booster 1 of the eleventh embodiment structured as mentioned above. The operation of the brake booster 1 when the pressure of the pressure source is normal is substantially the same as the operation of the ninth embodiment except that there is no operational rod 9*d* and the movement of the operation rod 9*d* is therefore none, and the output pressure Pr of the control valve 5 is supplied to the second reaction chamber 9*c* through the power chamber 10*c* during the braking action.

The operation of the brake booster 1 when the pressure of the pressure source fails is also substantially the same as the operation of the ninth embodiment except that the input shaft 4 operates the power piston 10*b* only through the second reaction piston 9*b*. In this case, it is also the same as the ninth embodiment that the most of the pedal input is utilized as the force for developing the braking pressure.

The effects of the brake booster 1 of the eleventh embodiment are substantially the same as those of the ninth embodiment.

Figure 12:
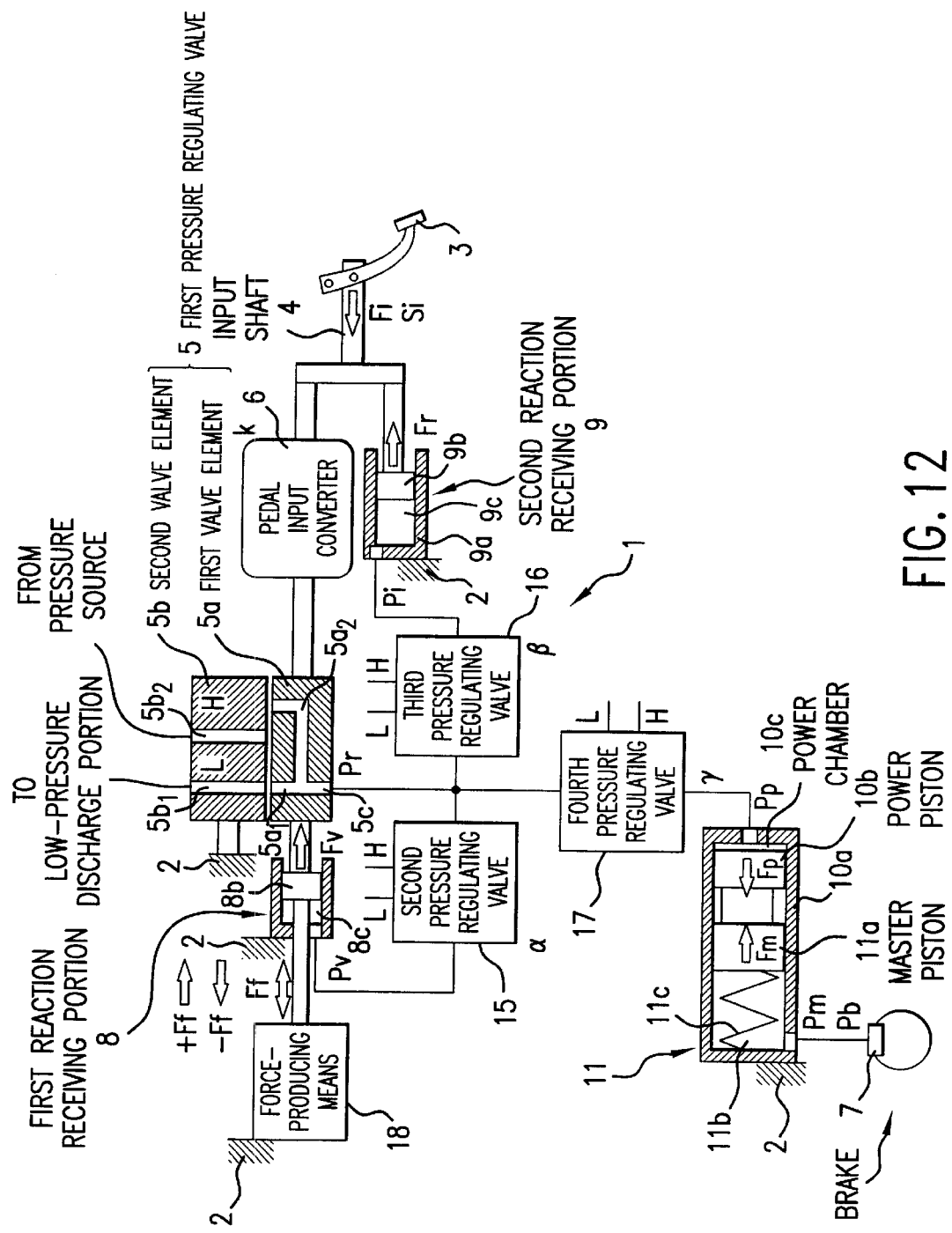
FIG. 12 is a view similar to FIG. 1 but schematically showing a brake system to which a twelfth embodiment of the present invention is adopted.

FIG. 12 is a view similar to FIG. 1 schematically showing the twelfth embodiment of the present invention.

As shown in FIG. 12, a brake booster 1 of the twelfth embodiment is similar to the brake booster 1 of the second embodiment, but further including a second pressure regulating valve 15 which is arranged in a fluid circuit connecting the output port 5*c* of the control valve 5 and the first reaction chamber 8*c* of the first reaction receiving portion 8 for regulating the output pressure Pr of the control valve 5 at a control ratio a to supply the regulated output pressure to the first reaction chamber 8*c*; a third pressure regulating valve 16 which is arranged in a fluid circuit connecting the output port 5*c* of the control valve 5 and the second reaction chamber 9*c* of the second reaction receiving portion 9 for regulating the output pressure Pr of the control valve 5 at a control ratio β to supply the regulated output pressure to the second reaction chamber 9*c*; and further a fourth pressure regulating valve 17 arranged in a fluid circuit connecting the output port 5*c* of the control valve 5 and the power chamber 10*c* of the power cylinder 10 for regulating the output pressure Pr of the control valve 5 at a control ratio β to supply the regulated output pressure to the power chamber 10*c*. In the following description, since the control valve 5 is a pressure regulating valve for regulating the pressure of the pressure source according to the pedal input and then outputting the regulated pressure, the control valve 5 is referred to as "first pressure regulating valve 5".

Though the second through fourth pressure regulating valves 15, 16, 17 are shown each having four ports: an input port, an output port, a high-pressure port, and a low-pressure port in FIG. 12, this is just for schematic illustration and each of the pressure regulating valves 15, 16, 17 may have none, either, or both of the high-pressure port and the low-pressure port in addition to both of the input port and the output port.

Employed as each of the pressure regulating valves 15, 16, 17 may be a mechanical pressure regulating valve which can regulate the output pressure of the output port 5*c* of the first pressure regulating valve 5 and output the regulated pressure, or a mechanical regulating valve which can regulate the pressure of the pressure source according to the output pressure of the output port 5*c* of the first pressure regulating valve and output the regulated pressure, but not illustrated.

A well-known proportioning valve (P-valve), not shown, may also be used as the pressure regulating valve. This P-valve has a characteristic which increases the output pressure relative to the input pressure at a large ratio until the input pressure reaches a predetermined value and increases the output pressure relative to the input pressure at a small ratio after the input pressure exceeds the predetermined value.

In addition, a proportional control solenoid valve, not shown, may also be used as the pressure regulating valve. When the braking pressure is required to be controlled (to be increased or decreased), the outputs of the regulating valves can be controlled by this proportional control solenoid valve. In this case, the proportional control solenoid valve outputs the output pressure of the first pressure regulating valve 15 without regulation when it is not operated. Each of the second through fourth pressure regulating valves 15, 16, 17 may be a pressure regulating valve of any type which can regulate the output pressure relative to the input pressure besides the above-mentioned pressure regulating valves.

The brake booster 1 of the twelfth embodiment further includes a force-producing means 18 for producing actuating force Ff for actuating the first reaction piston 8*b* of the first reaction receiving portion 8. The force-producing means 18 may be composed of a hydraulic cylinder or a solenoid.

The other structures of the brake booster 1 of the twelfth embodiment and the brake system thereof are the same as those of the second embodiment.

Hereinafter, description will be made as regard to the operation of the brake system with the brake booster 1 of the twelfth embodiment structured as mentioned above.

When the brake booster 1 is not operated as shown in FIG. 12, the first valve passage $5a_1$ of the first valve element 5*a* of the first pressure regulating valve 5 is connected to the low-pressure (L) valve passage $5b_1$ and the second valve passage $5a_2$ of the first valve element 5*a* is shut off from the high-pressure (H) valve passage $5b_2$ so that the output port 5*c* is connected to the low-pressure discharge portion and thus the output pressure Pr is not developed at the output port 5*c*. Therefore, the power cylinder 10 communicates with the lower-pressure discharge portion through the fourth pressure regulating valve 17 or further through the first pressure regulating valve 5 so that the power cylinder 10 and the master cylinder 11 are not operated to develop no braking fluid pressure. Since the output pressure Pr of the first pressure regulating valve 5 is not developed, the first reaction receiving portion 8 communicates with the low-pressure discharge portion through the second pressure regulating valve 15 or further through the first pressure regulating valve 5 and the second reaction receiving portion 9 communicates with the low-pressure discharge portion through the third pressure regulating valve 16 or further through the first pressure regulating valve 5 so that no reaction force is produced both in the first and second reaction receiving portions 8, 9.

As the brake pedal 3 is depressed, the first pressure regulating valve 5 develops output pressure Pr according to the pedal input in the same manner as the aforementioned second embodiment. The second through fourth pressure regulating valves 15, 16, 17 regulate the output pressure Pr of the first pressure regulating valve 5 at the control ratios α, β, γ, to output the regulated output pressures, respectively.

The output pressure Pv (=α·Pr) of the second pressure regulating valve 15 is supplied to the first reaction chamber 8*c* of the first reaction receiving portion 8. The output pressure Pv acts on the first reaction piston 8*b* so that the first reaction piston 8*b* produces first reaction force which acts on the first valve element 5*a* just like the second embodiment. As a result, the output pressure Pr of the first pressure regulating valve 5 is regulated to balance the actuating force Fv of the first valve element 5*a* depending upon the output pressure Pv with the thrust, generated based on a control ratio k, (k·Si) of the pedal input converter 6 (Pv·Av=Fv=k·Si;

wherein Av is the effective pressure receiving area of the first reaction piston 8b and Si is the travel of the input shaft 4). The output pressure Pp (=γ·Pr) of the fourth pressure regulating valve 17 is supplied to the power chamber 10c of the power cylinder 10 so that the power cylinder 10 outputs just like the second embodiment. By the output of the power cylinder 10, the master cylinder 11 is actuated to develop master cylinder pressure which is supplied to the wheel cylinder 7 as braking pressure Pb, thereby actuating the brake. At this point, the output pressure Pp and the braking pressure Pb are proportional to the pedal input and the output pressure Pv of the second pressure regulating valve 15. Further, the output pressure Pi (=β·Pr) of the third pressure regulating valve 17 is supplied to the second reaction chamber 9c of the second reaction receiving portion 9 to act on the second reaction piston 9b so that the second reaction piston 9b produces second reaction force which acts on the input shaft 4 just like the second embodiment. Therefore, the second reaction force is transmitted to the driver through the input shaft 4. At this point, the second reaction force is proportional to the pedal input and the output pressure Pv of the second regulating valve 15.

In this state, the force-producing means is activated by a signal indicating the pedal input or a control signal from a brake force controller so as to produce force Ff which acts as valve reaction force on the first valve element 5a through the first reaction piston 8b.

The relation between the input Fi applied to the input shaft 4 and the output pressure Pr of the first pressure regulating valve 5 is given by the following Expression 1. The marks used in the expressions will be described as follows. In this description, marks not used in any of the expressions but shown in the drawings for introducing the expressions will be also described.

Fi: input of the input shaft, Fv: valve reaction force, Fr: reaction force on the input shaft, Fp: thrust of the power piston, Fm: reaction force on the master piston, Ff: force produced by the force-producing means, Pr: output pressure of the first pressure regulating valve, Pv: fluid pressure in the first reaction receiving portion, Pi: fluid pressure in the second reaction receiving portion, Pp: fluid pressure in the power chamber, Pm: master cylinder pressure, Pb: braking pressure, Av: pressure receiving area of the first reaction receiving portion, Ar: pressure receiving area of the piston of the second reaction receiving portion, Ap: pressure receiving area of the piston of the power piston, Am: pressure receiving area of the master piston, α: proportional factor of the second pressure regulating valve, β: proportional factor of the third pressure regulating valve, γ: proportional factor of the fourth pressure regulating valve, Si: travel of the input shaft, k: force-converting factor.

$$Pr = \frac{Fi - Ff}{\alpha \cdot Av + \beta \cdot Ar} \quad (1)$$

The relations among the input Fi of the input shaft 4, the travel Si of the input shaft 4, and the braking pressure Pb, i.e. the characteristics of the brake booster 1 of this embodiment are as follows:

(1) Input Fi versus braking pressure Pb characteristic $$Pb = \frac{(Fi - Ff) \cdot \gamma \cdot Ap}{(\alpha \cdot Av + \beta \cdot Ar) \cdot Am} \quad (2)$$

(2) Input Fi versus travel Si characteristic $$Si = \frac{Fi \cdot \alpha \cdot Av + Ff \cdot \beta \cdot Ar}{k \cdot (\alpha \cdot Av + \beta \cdot Ar)} \quad (3)$$

(3) Travel Si versus braking pressure Pb characteristic $$Pb = \frac{(k \cdot Si - Ff) \cdot \gamma \cdot Ap}{\alpha \cdot Av \cdot Am} \quad (4)$$

From the above expressions, the output force Ff of the force-producing means 18 should be set to obtain the following expression:

Fi>Ff (5)

to develop the braking pressure Pb.

The characteristics can be freely varied according to the braking conditions by suitably changing the control ratios α, β, γ of the second through fourth pressure regulating valves 15, 16, 17 and the output force Ff of the force-producing means 18 singly or in combination. Table 1 indicates the changes in the respective characteristics (1) through (3) when the control ratios α, β, γ and the output Ff are changed.

TABLE 1

| | PEDAL INPUT CONVERTER CONTROL RATIO: k | SECOND PRESSURE REGULATING VALVE CONTROL RATIO: α | THIRD PRESSURE REGULATING VALVE CONTROL RATIO: β | FOURTH PRESSURE REGULATING VALVE CONTROL RATIO: γ | FORCE-PRODUCING MEANS FORCE: Ff |
|---|---|---|---|---|---|
| Input Fi vs. Braking Pressure Pb | W/O CHANGE | Increase in α → Decrease in Pb | Increase in β → Decrease in Pb | Increase in γ → Increase in Pb | Increase in Ff → Decrease in Pb |
| Input Fi vs. Travel Si | Increase in k → Increase in Si | Increase in α → Increase in Si | Increase in β → Decrease in Si | W/O CHANGE | Increase in Ff → Increase in Si |
| Travel Si vs. Braking Pressure Pb | Increase in k → Increase in Pb | Increase in α → Decrease in Pb | W/O CHANGE | Increase in γ → Increase in Pb | Increase in Ff → Decrease in Pb |

When the second through fourth pressure regulating valves 15, 16, 17 and the force-producing means 18 are not provided (i.e. in a case of the second embodiment shown in FIG. 2), α=β=γ=1 and Ff=0, so the above Expressions 1 through 4 are replaced with the following expressions:

$$Pro = \frac{Fi}{Av + Ar} \quad (6)$$

-continued $$Pbo = \frac{Fi \cdot Ap}{(Av + Ar) \cdot Am} \quad (7)$$

$$Sio = \frac{Fi \cdot Av}{k \cdot (Av + Ar)} \quad (8)$$

$$Pbo = \frac{k \cdot Si \cdot \gamma \cdot Ap}{Av \cdot Am} \quad (9)$$

Further, the brake booster 1 of the twelfth embodiment is structured to enable the automatic braking. That is, the fourth pressure regulating valve 17 is composed of a proportional control solenoid valve and is controlled by an external signal other than the input Fi to regulate the high pressure (H) from the external pressure source in proportion to the magnitude of the external signal regardless of the input Fi from the input shaft 3 and the regulated pressure is supplied directly to the wheel cylinder 7 without passing through the first pressure regulating valve 5. In this manner, the braking pressure Pb can be automatically developed. In this case, the braking pressure Pb is discharged directly to the low-pressure discharge portion by the fourth pressure regulating valve 17 without passing through the first pressure valve 5 when the braking action is cancelled. Therefore, the brake booster 1 of the twelfth embodiment enables the automatic braking.

Because the automatic braking is enabled, the brake control for controlling the distance from another vehicle is also enabled. That is, by automatically actuating the brake when the distance from a vehicle in front becomes shorter than a predetermined distance corresponding to the vehicle speed, the distance from the vehicle in front can be suitably held. Further, by automatically actuating the brake when an obstacle object is detected in front of the subject vehicle, a collision with the obstacle object can be avoided. Furthermore, by automatically actuating the brake when the driving wheel(s) is in slipping tendency at the starting, the slipping tendency can be cancelled or restrained.

In the brake booster 1 of the twelfth embodiment, the regenerative brake coordination control is also enabled. That is, when a regenerative brake system (not shown) is provided in the brake system of the twelfth embodiment, the fourth pressure regulating valve 17 is controlled to reduce the braking force produced by the service brake system for braking force produced by the regenerative brake system when the regenerative brake system is operated.

In the brake booster 1 of the twelfth embodiment, the brake assist control is also enabled. That is, when it is detected that the braking force is insufficient in comparison with the pedaling speed in the event of emergency braking or the like, the braking force can be increased.

Regardless of the input Fi from the input shaft 4, the force-producing means 18 is activated by an external signal other than the input Fi to move the first valve element 5a to the left so as to switch the first pressure regulating valve 5 in the same manner as the normal braking operated by pedaling the brake pedal 3. Therefore, the high pressure (H) from the pressure source is regulated by the first pressure regulating valve 5 in proportion to the magnitude of the external signal and the regulated pressure is supplied to the wheel cylinder 7, thereby automatically developing braking pressure Pb, or increasing or decreasing the braking force of the service brake system. This structure also enables the brake booster 1 of the twelfth embodiment to perform the automatic braking, the regenerative brake coordination control, and/or the brake assist control.

The second pressure regulating valve 15 is composed of a proportional control solenoid valve and the cylinder member 8a is provided with a pressure chamber, not shown, on the right side of the first reaction piston 8b (the opposite side of the first reaction chamber 8c). The output pressure of the second pressure regulating valve 15 is supplied to the pressure chamber by an electromagnetic switching valve not shown. Regardless of the input Fi from the input shaft 4, the second pressure regulating valve 15 is actuated by an external signal other than the input Fi to regulate the high pressure (H) of the pressure source in proportion to the magnitude of the external signal and the regulated pressure is supplied to the pressure chamber in the cylinder member 8a to act on the first reaction piston 8b to the left. Thus, the first reaction piston 8b is moved to the left so that the first valve element 5a is moved to the left, thereby switching the first pressure regulating valve 5. Therefore, the braking pressure Pb can be automatically developed or the braking force of the service brake system can be increased or decreased just like the braking operation by the force-producing means 18. This structure also enables the brake booster 1 of the twelfth embodiment to perform the automatic braking, the regenerative brake coordination control, and/or the brake assist control.

The other actions of the brake system with the brake booster 1 of the twelfth embodiment are the same as those of the second embodiment.

The other effects of the brake booster 1 of the twelfth embodiment are substantially the same as those of the first embodiment.

Though the second through fourth pressure regulating valves 15, 16, 17 and the force-producing means 18 are adopted to the brake system of the second embodiment having the power cylinder 10 and the master cylinder 11 in the twelfth embodiment, the second through fourth pressure regulating valve 15, 16, 17 and the force-producing means 18 may be adopted to the brake system of the first embodiment without having the power cylinder 10 and the master cylinder 11. In this case, the output pressure of the fourth pressure regulating valve 17 is supplied directly to the wheel cylinder 7.

Figure 13:
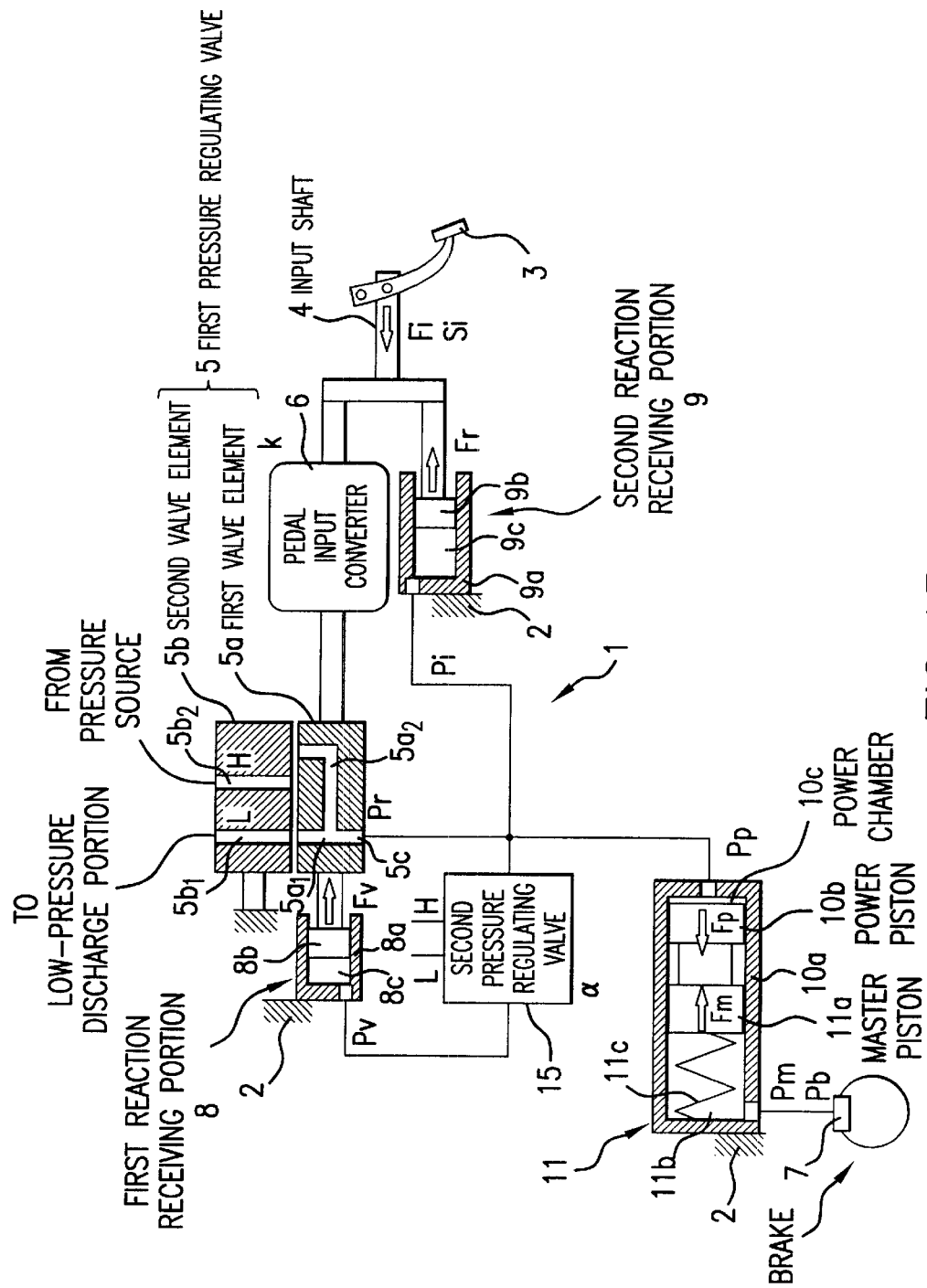
FIG. 13 is a view similar to FIG. 1 but schematically showing a brake system to which a thirteenth embodiment of the present invention is adopted.

FIG. 13 is a view similar to FIG. 1 schematically showing the thirteenth embodiment of the present invention.

As shown in FIG. 13, a brake booster 1 of the thirteenth embodiment is similar to the brake booster 1 of the aforementioned twelfth embodiment shown in FIG. 12 except that among the second through fourth pressure regulating valves 15, 16, 17, only the second pressure regulating valve 15 is provided and the third and fourth pressure regulating valves 16, 17 and the force-producing means 18 are not provided.

The other structures of the brake booster 1 of the thirteenth embodiment and the brake system thereof are the same as those of the twelfth embodiment.

Hereinafter, description will be made as regard to the operation of the brake system with the brake booster 1 of the thirteenth embodiment structured as mentioned above.

The operation of the brake system of the thirteenth embodiment is the same as that of the twelfth embodiment except the actions of the third and fourth pressure regulating valves 16, 17 and the force-producing means 18.

In the thirteenth embodiment, since $\beta=\gamma=1$ and Ff=0, the following expressions are obtained:

(1) Input Fi versus braking pressure Pb characteristic $$Pb = \frac{Fi \cdot Ap}{(\alpha \cdot Av + Ar) \cdot Am} \quad (10)$$

(2) Input Fi versus travel Si characteristic $$Si = \frac{Fi \cdot \alpha \cdot Av}{k \cdot (\alpha \cdot Av + Ar)} \quad (11)$$

From these Expressions 10, 11, it is found that by changing the control ratio α of the second pressure regulating valve 15, the braking pressure Pb and the travel Si of the thirteenth embodiment vary as follows. Assuming that the braking pressure $Pb_0$ (given by Expression 7) and the travel $Si_0$ (given by Expression 8) in case of that even the second pressure regulating valve 15 is not provided (i.e. in case of the second embodiment) are respective reference values, in case of a α<1, the braking pressure Pb is larger than the reference value $Pb_0$ and the travel Si is smaller than the reference value $Si_0$ and in case of α>1, the braking pressure Pb is smaller than the reference value $Pb_0$ and the travel Si is larger than the reference value $Si_0$. When the pressure receiving area Av of the piston of the first reaction receiving portion is set to be sufficiently smaller than the pressure receiving area Ar of the piston of the second reaction receiving portion (Av<<Ar), in either case of α<1 or α>1, the braking pressure Pb is nearly equal to the reference value $Pb_0$ (Pb≈$Pb_0$), and in case of α<1, the travel Si is smaller than the reference value $Si_0$, and in case of α>1, the travel Si is larger than the reference value $Si_0$.

Figure 14:
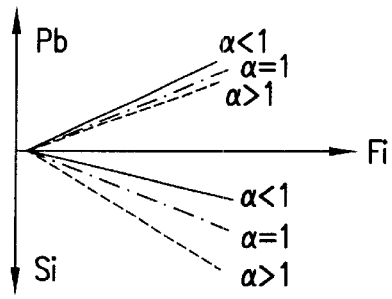
FIG. 14 is a diagram showing the characteristics of the brake booster of the thirteenth embodiment shown in FIG. 13.

That is, the characteristics when Av<<Ar are shown in FIG. 14. Accordingly, the travel Si can be varied with little change in the braking pressure Pb by using the second pressure regulating valve 15 and setting Av sufficiently smaller than Ar. That is, the thirteenth embodiment can provide the travel variant characteristics.

The other effects of the brake booster 1 of the thirteenth embodiment are substantially the same as those of the first embodiment.

Figure 15:
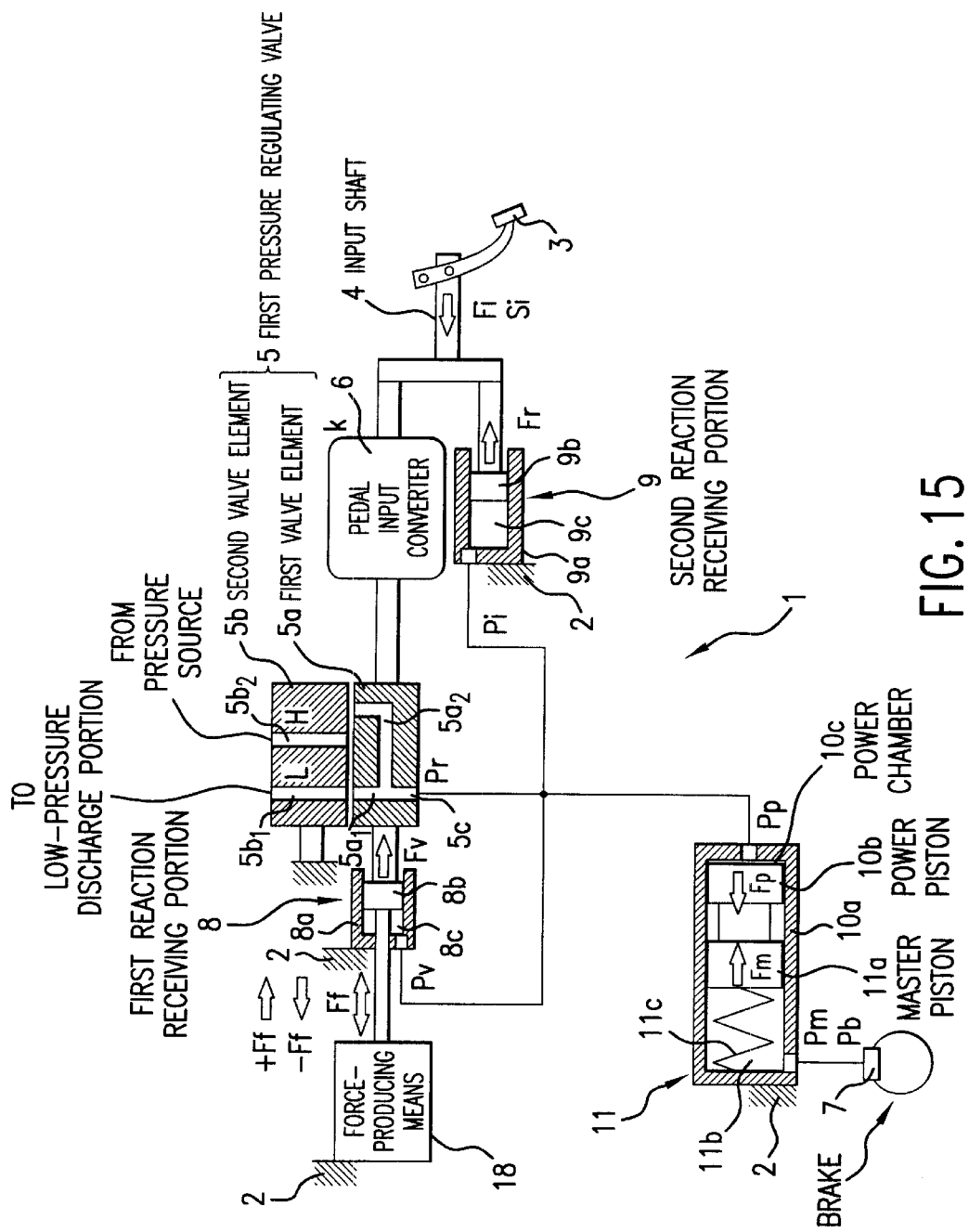
FIG. 15 is a view similar to FIG. 1 but schematically showing a brake system to which a fourteenth embodiment of the present invention is adopted.

FIG. 15 is a view similar to FIG. 1 schematically showing the fourteenth embodiment of the present invention.

As shown in FIG. 15, a brake booster 1 of the fourteenth embodiment is similar to the brake booster 1 of the aforementioned twelfth embodiment shown in FIG. 12 except that the second through fourth pressure regulating valves 15, 16, 17 are not provided and only the force-producing means 18 is provided.

The other structures of the brake booster 1 of the fourteenth embodiment and the brake system thereof are the same as those of the twelfth embodiment.

Hereinafter, description will be made as regard to the operation of the brake system with the brake booster 1 of the fourteenth embodiment structured as mentioned above.

The operation of the brake system of the fourteenth embodiment is the same as that of the twelfth embodiment except the actions of the second through fourth pressure regulating valves 15, 16, 17.

In the fourteenth embodiment, since α=β=γ=1, the following expressions are obtained:
(1) Input Fi versus braking pressure Pb characteristic $$Pb = \frac{(Fi - Ff) \cdot Ap}{(Av + Ar) \cdot Am} \quad (12)$$

(2) Input Fi versus travel Si characteristic $$Si = \frac{Fi \cdot Av + Ff \cdot Ar}{k \cdot (Av + Ar)} \quad (13)$$

From these Expressions 12, 13, it is found that by changing the force Ff produced by the force-producing means 18 according to the input Fi of the input shaft 4, the braking pressure Pb and the travel Si of the fourteenth embodiment vary as follows.

In case of Ff<0, the braking pressure Pb is larger than the reference value $Pb_0$ and the travel Si is smaller than the reference value $Si_0$ and in case of Ff>0, the braking pressure Pb is smaller than the reference value $Pb_0$ and the travel Si is larger than the reference value $Si_0$. When the force Ff is set to be sufficiently smaller than the input Fi (Ff<<Fi), in either case of Ff<0 or Ff>0, the braking pressure Pb is nearly equal to the reference value $Pb_0$ (Pb≈$Pb_0$), and in case of Ff<0, the travel Si is smaller than the reference value $Si_0$, and in case of Ff>0, the travel Si is larger than the reference value $Si_0$.

Figure 16:
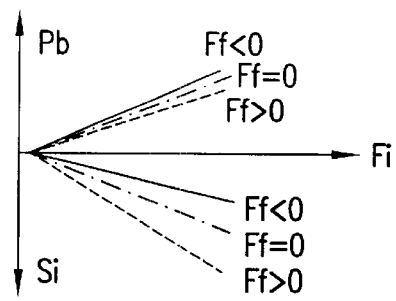
FIG. 16 is a diagram similar to FIG. 14 but showing the characteristics of the brake booster of the fourteenth embodiment shown in FIG. 15.

That is, the characteristics when Ff<<Fi are shown in FIG. 16. Accordingly, the travel Si can be varied with little change in the braking pressure Pb by using the force-producing means 18 and setting Ff sufficiently smaller than Fi. That is, the fourteenth embodiment can also provide the travel variant characteristics.

The other effects of the brake booster 1 of the fourteenth embodiment are substantially the same as those of the first embodiment.

Figure 17:
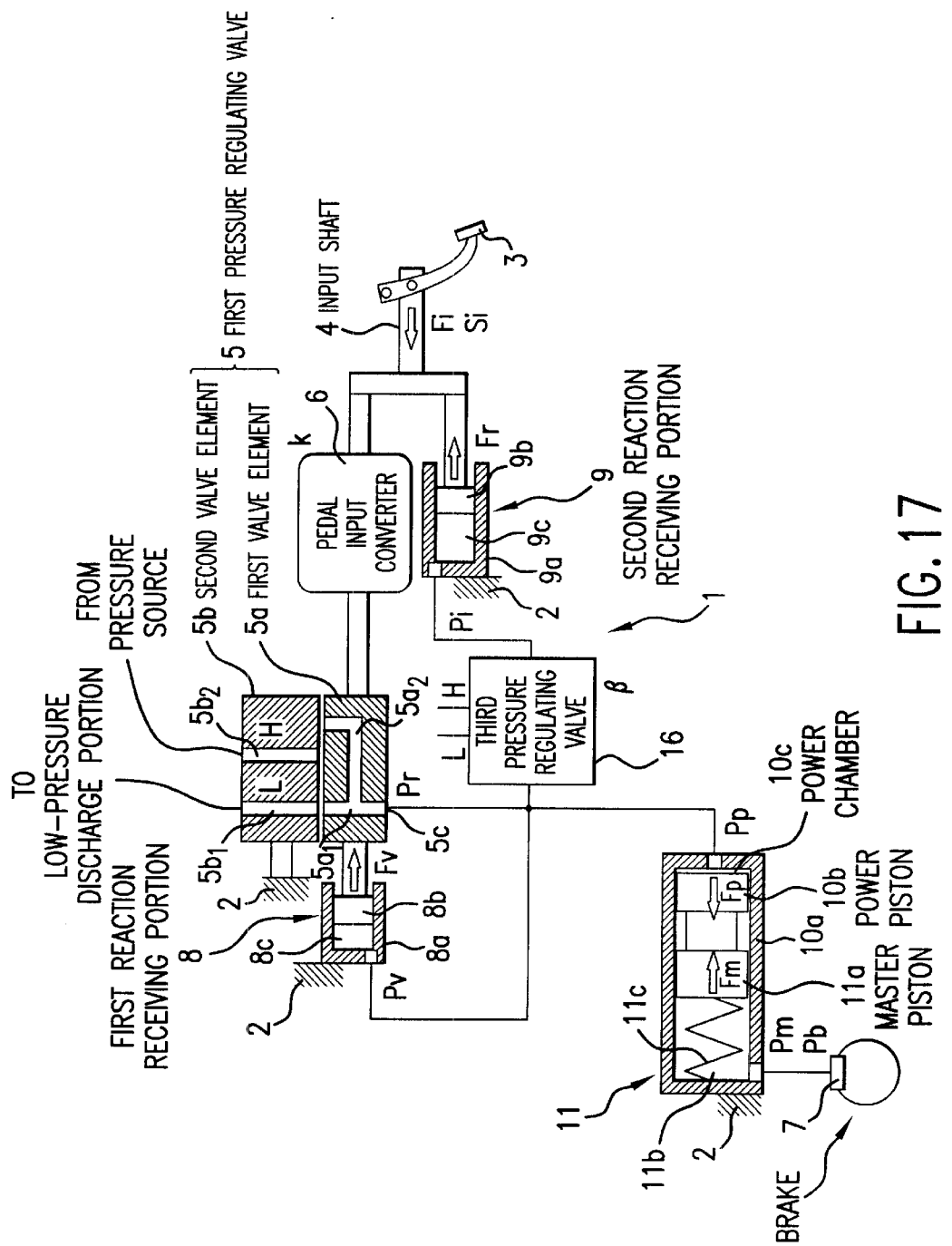
FIG. 17 is a view similar to FIG. 1 but schematically showing a brake system to which a fifteenth embodiment of the present invention is adopted.

FIG. 17 is a view similar to FIG. 1 schematically showing the fifteenth embodiment of the present invention.

As shown in FIG. 17, a brake booster 1 of the fifteenth embodiment is similar to the brake booster 1 of the aforementioned twelfth embodiment shown in FIG. 12 except that among the second through fourth pressure regulating valves 15, 16, 17, the third pressure regulating valve 16 is provided and the second and fourth pressure regulating valves 15, 17 and the force-producing means 18 are not provided.

The other structures of the brake booster 1 of the fifteenth embodiment and the brake system thereof are the same as those of the twelfth embodiment.

Hereinafter, description will be made as regard to the operation of the brake system with the brake booster 1 of the fifteenth embodiment structured as mentioned above.

The operation of the brake system of the fifteenth embodiment is the same as that of the twelfth embodiment except the actions of the second and fourth pressure regulating valves 15, 17 and the force-producing means 18.

In the fifteenth embodiment, since α=β=1 and Ff=0, the following expressions are obtained:
(1) Input Fi versus braking pressure Pb characteristic $$Pb = \frac{Fi \cdot Ap}{(Av + \beta \cdot Ar) \cdot Am} \quad (14)$$

(2) Input Fi versus travel Si characteristic $$Si = \frac{Fi \cdot Av}{k \cdot (Av + \beta \cdot Ar)} \quad (15)$$

From these Expressions 14, 15, it is found that by changing the control ratio β of the third pressure regulating valve 16, the braking pressure Pb and the travel Si of the fifteenth embodiment vary as follows.

In case of β<1, the braking pressure Pb and the travel Si are both larger than the reference values $Pb_0$, $Si_0$ and in case of β>1, the braking pressure Pb and the travel Si are both smaller than the reference value $Pb_0$, $Si_0$.

Figure 18:
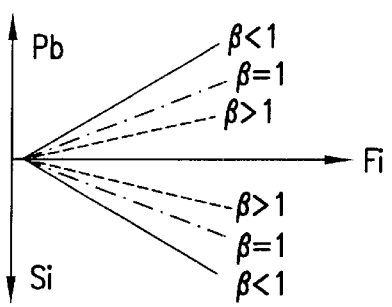
FIG. 18 is a diagram similar to FIG. 14 but showing the characteristics of the brake booster of the fifteenth embodiment shown in FIG. 17.

That is, the characteristics are shown in FIG. 18. At this point, (3) the travel Si versus braking pressure Pb characteristic is given by:

$$Pb = \frac{k \cdot Si \cdot Ap}{Av \cdot Am} \quad (16)$$

As apparent from the Expression 16, the relation between the travel Si and the braking pressure Pb is fixed regardless of the value of β. Accordingly, the braking pressure Pb and the travel Si can be varied relative to the input Fi without changing the braking pressure Pb relative to the input Fi by using the third pressure regulating valve 16. That is, the fifteenth embodiment can also provide the reaction variant characteristics.

The other effects of the brake booster 1 of the fifteenth embodiment are substantially the same as those of the first embodiment.

Figure 19:
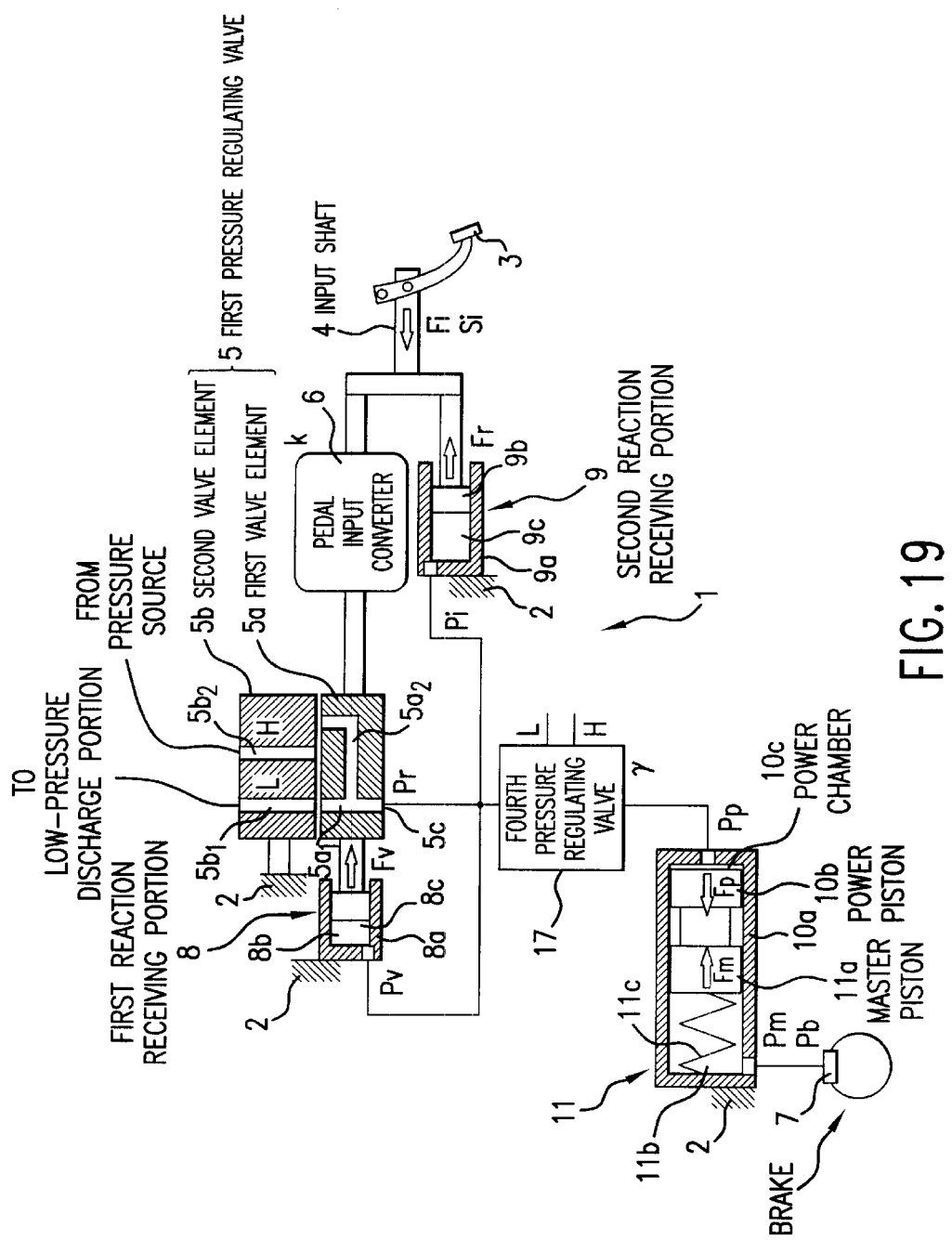
FIG. 19 is a view similar to FIG. 1 but schematically showing a brake system to which a sixteenth embodiment of the present invention is adopted.
Figure 22:
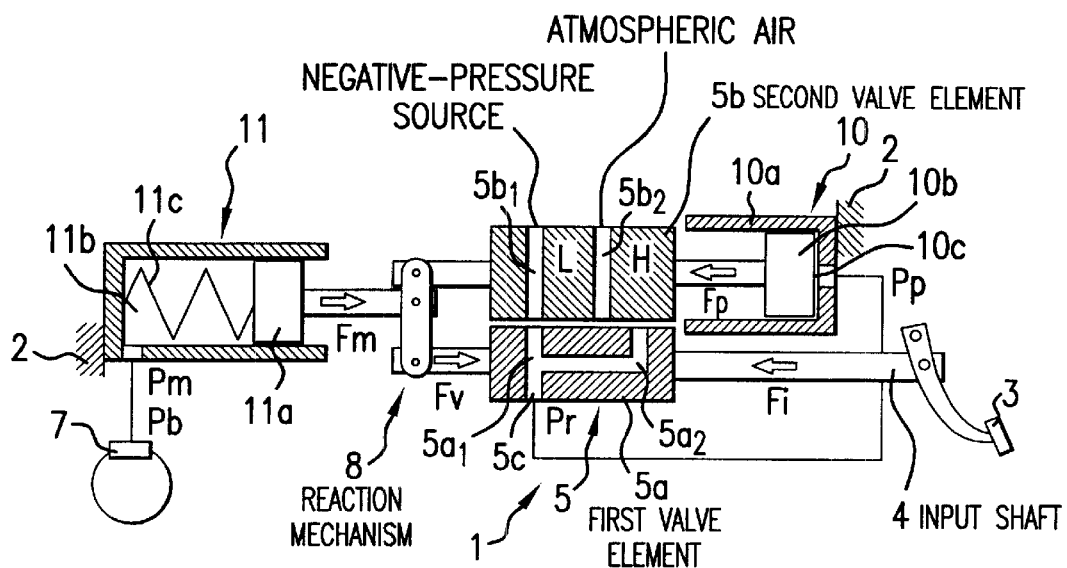
FIG. 22 is a view similar to FIG. 1 but schematically showing a brake system employing a conventional vacuum booster.
Figure 23:
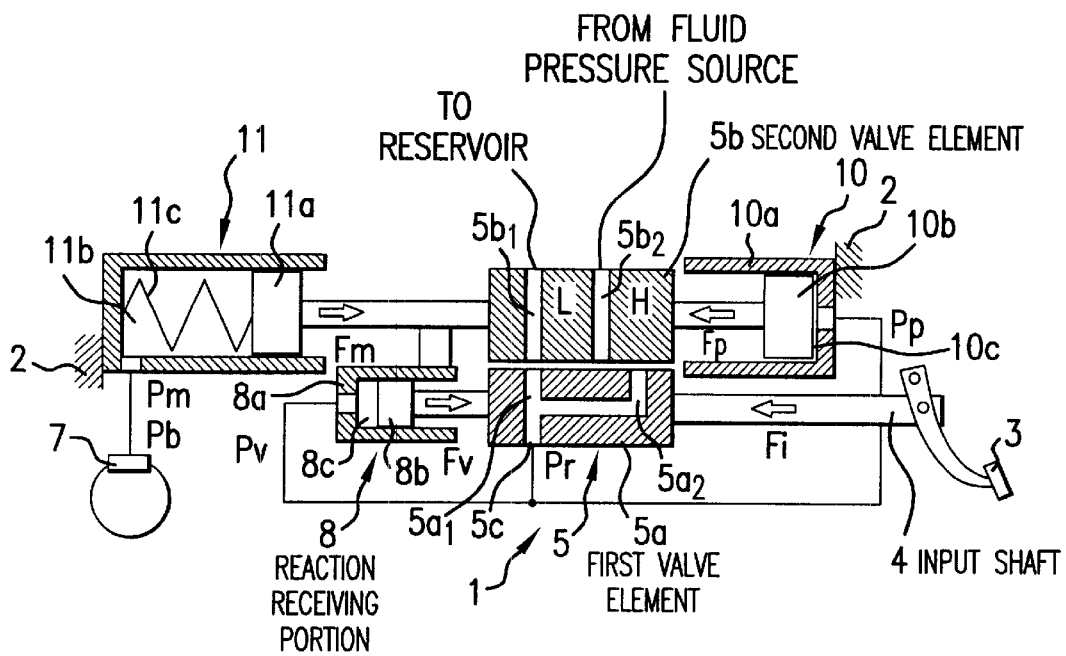
FIG. 23 is a view similar to FIG. 1 but schematically showing a brake system employing a conventional hydraulic booster.
Figure 24:
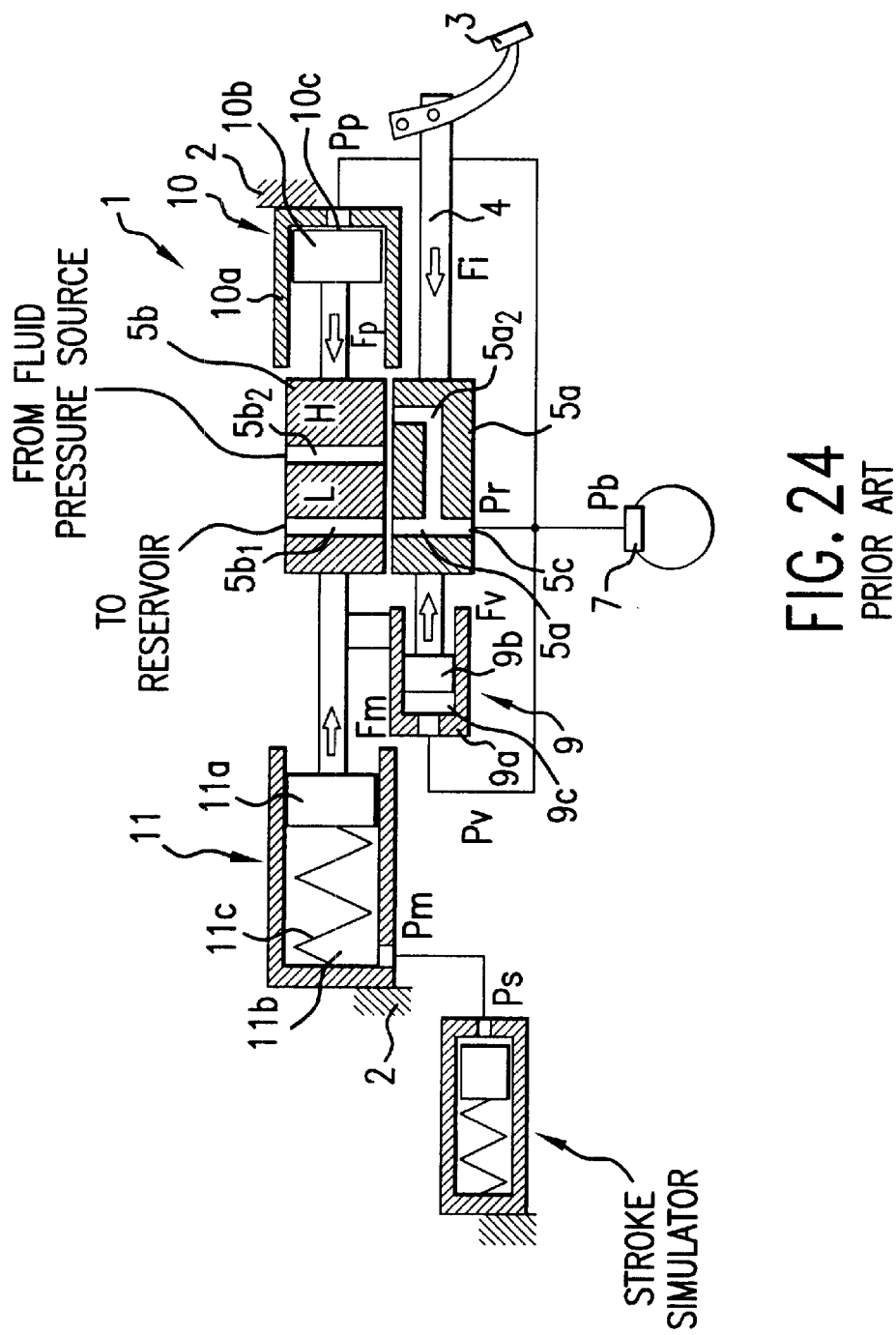
FIG. 24 is a view similar to FIG. 1 but schematically showing a brake system employing a conventional stroke simulator.

FIG. 19 is a view similar to FIG. 1 schematically showing the sixteenth embodiment of the present invention.

As shown in FIG. 19, a brake booster 1 of the sixteenth embodiment is similar to the brake booster 1 of the aforementioned twelfth embodiment shown in FIG. 12 except that among the second through fourth pressure regulating valves 15, 16, 17, the fourth pressure regulating valve 17 is provided and the second and third pressure regulating valves 15, 16 and the force-producing means 18 are not provided.

The other structures of the brake booster 1 of the sixteenth embodiment and the brake system thereof are the same as those of the twelfth embodiment.

Hereinafter, description will be made as regard to the operation of the brake system with the brake booster 1 of the sixteenth embodiment structured as mentioned above.

The operation of the brake system of the sixteenth embodiment is the same as that of the twelfth embodiment except the actions of the second and third pressure regulating valves 15, 16 and the force-producing means 18.

In the sixteenth embodiment, since α=β=1 and Ff=0, the following expressions are obtained:

(1) Input Fi versus braking pressure Pb characteristic $$Pb = \frac{Fi \cdot \gamma \cdot Ap}{(Av + Ar) \cdot Am} \quad (17)$$

(2) Input Fi versus travel Si characteristic $$Si = \frac{Fi \cdot Av}{k \cdot (Av + Ar)} \quad (18)$$

From these Expressions 17, 18, it is found that by changing the control ratio γ of the fourth pressure regulating valve 17, the braking pressure Pb and the travel Si of the sixteenth embodiment vary as follows.

In case of γ<1, the braking pressure Pb is smaller than the reference value $Pb_0$ and the travel Si is equal to the reference value $Si_0$ and in case of γ>1, the braking pressure Pb is larger than the reference value $Pb_0$ and the travel Si is equal to the reference value $Si_0$.

Figure 20:
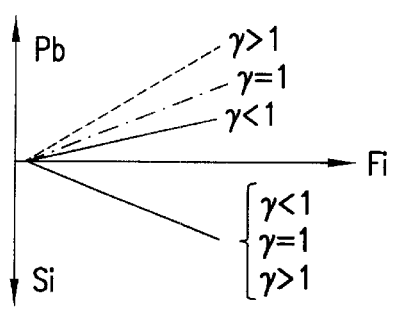
FIG. 20 is a diagram similar to FIG. 14 but showing the characteristics of the brake booster of the sixteenth embodiment shown in FIG. 19.

That is, the characteristics are shown in FIG. 20. Accordingly, the braking pressure Pb can be varied without changing the travel Si relative to the input Fi by using the fourth pressure regulating valve 17. That is, the sixteenth embodiment can also provide the output variant characteristics.

The other effects of the brake booster 1 of the sixteenth embodiment are substantially the same as those of the first embodiment.

The seventeenth embodiment, not shown, is similar to the brake booster 1 of the second embodiment shown in FIG. 2 except that the control ratio k of the pedal input converter 6 can be set variously.

Since (1) the input Fi versus braking pressure Pb characteristic and (2) the input Fi versus travel Si characteristic of the brake booster 1 of the second embodiment are given by Expression 7 and Expression 8, respectively, it is found that by changing the control ratio k of the pedal input converter 6, the braking pressure Pb and the travel Si of the seventeenth embodiment vary as follows.

In case of k<1, the braking pressure Pb is equal to the reference value $Pb_0$ and the travel Si is larger than the reference value $Si_0$ and in case of k>1, the braking pressure Pb is equal to the reference value $Pb_0$ and the travel Si is smaller than the reference value $Si_0$.

Figure 21:
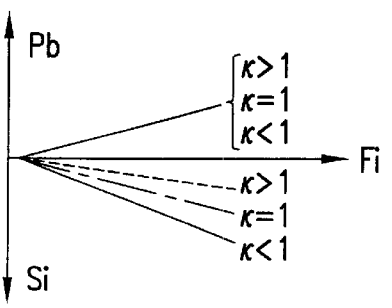
FIG. 21 is a diagram similar to FIG. 14 but showing the characteristics of the brake booster of the seventeenth embodiment.

That is, the characteristics are shown in FIG. 21. Accordingly, the travel Si can be varied without changing the braking pressure Pb relative to the input Fi by changing the control ratio k of the pedal input converter 6. That is, the seventeenth embodiment can also provide the travel variant characteristics.

The other effects of the brake booster 1 of the seventeenth embodiment are substantially the same as those of the first embodiment.

As apparent from the above description, according to the brake booster of the present invention, the input side and the output side thereof can be separated. Therefore, when the control of the braking force is conducted in the brake circuit between the control valve and the brake cylinder during the braking action, the brake operating means is not affected or at least hardly affected by this control of the braking force.

According to the brake booster of the present invention, without being affected by the output side of the brake booster 1, the input versus braking pressure characteristic, the input versus travel characteristic, or the travel versus braking pressure characteristic can be varied without large-scale modification.

According to the brake booster of the present invention, regardless of the input of the input side during the braking action, the control of the braking force can be conducted in the brake circuit between the control valve and the wheel cylinder. Accordingly, the brake booster can be easily and flexibly adopted to such system in which the control of the braking pressure can be required during the operation of the brake booster regardless of the operation of the brake operating means, for instance, the control for reducing the braking pressure to be conducted during the operation of a regenerative brake system with a regenerative brake coordination control, and the control for increasing the braking pressure to be conducted during the brake assisting operation by a brake assist system.

Further, the pedal input converter moves when converting the pedal input into the actuating force, thereby ensuring the operational travel of the brake operating means. This means that the pedal input converter exhibits the same function as a conventional stroke simulator.

Furthermore, since an elastic member such as a spring or an actuator which detects the displacement of the input shaft and operates according to the displacement detected is employed as the pedal input converter, the brake booster can be small-sized and inexpensive.

In addition, the brake booster allows the brakes to be securely actuated even when the pressure of the pressure source fails.

What we claim is:

1. A brake booster comprising at least a housing, an input shaft which is actuated by an operational input applied through an operation of brake operating means, and a control valve which is disposed in said housing and is operated by an actuation of said input shaft to regulate a pressure of a pressure source according to the operational input of said brake operating means to output a regulated pressure, wherein said control valve has at least a first valve element and a second valve element, said first valve element is moved relative to said second valve element by the actuation of said input shaft and is subjected to an output pressure of said control valve in a direction opposite to an actuating force of said input shaft, and said second valve element is fixed to said housing, said brake booster further comprising operational input converting means which is disposed between said input shaft and said first valve element and at least partially displaced by the input of said input shaft to convert the operational input of said brake operating means to actuating force for operating said first valve element according to the operational input, and characteristic varying means for allowing input and output characteristics to be varied, said characteristic varying means having a pressure regulating valve which regulates the output pressure of said control valve or the pressure of said pressure source to output the regulated pressure that acts on said first valve element in a direction opposite to the actuating force of the input shaft.

2. A brake booster comprising at least a housing, an input shaft which is actuated by an operational input applied through an operation of brake operating means, and a control valve which is disposed in said housing and is operated by an actuation of said input shaft to regulate a pressure of a pressure source according to the operational input of said brake operating means to output a regulated pressure, wherein said control valve has at least a first valve element and a second valve element, said first valve element is moved relative to said second valve element by the actuation of said input shaft and is subjected to an output pressure of said control valve in a direction opposite to an actuating force of said input shaft, and said second valve element is fixed to said housing, said brake booster further comprising operational input converting means which is disposed between said input shaft and said first valve element and at least partially displaced by the input of said input shaft to convert the operational input of said brake operating means to actuating force for operating said first valve element according to the operational input, and characteristic varying means for allowing input and output characteristics to be varied, said characteristic varying means having a pressure regulating valve which regulates the output pressure of said control valve or the pressure of said pressure source to output the regulated pressure that acts on said input shaft in a direction opposite to the operation of said brake operating means.

3. A brake booster comprising at least a housing, an input shaft which is actuated by an operational input applied through an operation of brake operating means, and a control valve which is disposed in said housing and is operated by an actuation of said input shaft to regulate a pressure of a pressure source according to the operational input of said brake operating means to output a regulated pressure, wherein said control valve has at least a first valve element and a second valve element, said first valve element is moved relative to said second valve element by the actuation of said input shaft and is subjected to an output pressure of said control valve in a direction opposite to an actuating force of said input shaft, and said second valve element is fixed to said housing, said brake booster further comprising operational input converting means which is disposed between said input shaft and said first valve element and at least partially displaced by the input of said input shaft to convert the operational input of said brake operating means to actuating force for operating said first valve element according to the operational input, and characteristic varying means for allowing input and output characteristics to be varied, said characteristic varying means having a pressure regulating valve which regulates the output pressure of said control valve or the pressure of said pressure source to output the regulated pressure whereby an output of said brake booster is produced.

4. A brake booster comprising at least a housing, an input shaft which is actuated by an operational input applied through an operation of brake operating means, and a control valve which is disposed in said housing and is operated by an actuation of said input shaft to regulate a pressure of a pressure source according to the operational input of said brake operating means to output a regulated pressure, wherein said control valve has at least a first valve element and a second valve element, said first valve element is moved relative to said second valve element by the actuation of said input shaft and is subjected to an output pressure of said control valve in a direction opposite to an actuating force of said input shaft, and said second valve element is fixed to said housing, said brake booster further comprising operational input converting means which is disposed between said input shaft and said first valve element and at least partially displaced by the input of said input shaft to convert the operational input of said brake operating means to actuating force for operating said first valve element according to the operational input, and characteristic varying means for allowing input and output characteristics to be varied, said characteristic varying means having reaction force producing means which produces a reaction force acting on said first valve element in a direction opposite to the actuating force of said input shaft.

* * * * *